(12) United States Patent
Kitada et al.

(10) Patent No.: US 10,445,706 B2
(45) Date of Patent: Oct. 15, 2019

(54) ELECTRONIC MEETING INTELLIGENCE

(71) Applicants: Hiroshi Kitada, Tuckahoe, NY (US); Steven A. Nelson, San Jose, CA (US); Lana Wong, Belleville, NJ (US); Charchit Arora, Sunnyvale, CA (US)

(72) Inventors: Hiroshi Kitada, Tuckahoe, NY (US); Steven A. Nelson, San Jose, CA (US); Lana Wong, Belleville, NJ (US); Charchit Arora, Sunnyvale, CA (US)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/112,361

(22) Filed: Aug. 24, 2018

(65) Prior Publication Data
US 2018/0365657 A1 Dec. 20, 2018

Related U.S. Application Data

(63) Continuation of application No. 15/477,240, filed on Apr. 3, 2017, now Pat. No. 10,062,057, which is a
(Continued)

(51) Int. Cl.
*H04N 7/15* (2006.01)
*G06Q 10/10* (2012.01)
(Continued)

(52) U.S. Cl.
CPC ......... *G06Q 10/1095* (2013.01); *G06Q 10/10* (2013.01); *G10L 25/57* (2013.01);
(Continued)

(58) Field of Classification Search
CPC .......... H04N 7/15; H04L 29/06; G10L 25/63; G10L 25/57; H04M 7/00; H04M 3/56
(Continued)

(56) References Cited

U.S. PATENT DOCUMENTS 5,572,728 A 11/1996 Tada et al.
5,907,324 A 5/1999 Larson et al.
(Continued)

FOREIGN PATENT DOCUMENTS

JP 07-182365 7/1995
JP 07-191690 7/1995
(Continued)

OTHER PUBLICATIONS

U.S. Appl. No. 14/992,273, filed Jan. 11, 2016, Office Action, dated Jul. 29, 2016.
(Continued)

*Primary Examiner* — Melur Ramakrishnaiah
(74) *Attorney, Agent, or Firm* — Hickman Palermo Becker Bingham LLP; Edward A. Becker

(57) ABSTRACT

Techniques related to electronic meeting intelligence are disclosed. An apparatus receives audio/video data including first meeting content data for an electronic meeting that includes multiple participants. The apparatus extracts the first meeting content data from the audio/video data. The apparatus generates meeting content metadata based on analyzing the first meeting content data. The apparatus includes the meeting content metadata in a report of the electronic meeting. If the apparatus determines that the audio/video data includes a cue for the apparatus to intervene in the electronic meeting, the apparatus generates intervention data including second meeting content data that is different from the first meeting content data. During the electronic meeting, the apparatus sends the intervention data to one or more nodes associated with at least one participant of the multiple participants.

20 Claims, 18 Drawing Sheets

Related U.S. Application Data continuation of application No. 14/992,273, filed on Jan. 11, 2016, now Pat. No. 9,641,563.

(60) Provisional application No. 62/253,325, filed on Nov. 10, 2015.

(51) Int. Cl.
| | | |
|---|---|---|
| *H04L 29/06* | (2006.01) | |
| *G10L 25/63* | (2013.01) | |
| *G10L 25/57* | (2013.01) | |
| *H04L 12/18* | (2006.01) | |
| *H04M 3/56* | (2006.01) | |
| *H04M 7/00* | (2006.01) | |

(52) U.S. Cl.
CPC .......... *G10L 25/63* (2013.01); *H04L 12/1822* (2013.01); *H04L 12/1831* (2013.01); *H04L 65/1083* (2013.01); *H04L 65/403* (2013.01); *H04M 3/567* (2013.01); *H04M 7/0027* (2013.01); *H04N 7/15* (2013.01); *H04N 7/152* (2013.01); *H04M 2201/40* (2013.01)

(58) Field of Classification Search
USPC .............................. 348/14.01–14.16; 705/719
See application file for complete search history.

(56) References Cited

U.S. PATENT DOCUMENTS

| | | | |
|---|---|---|---|
| 6,377,288 | B1 | 4/2002 | Moran |
| 6,789,064 | B2 | 9/2004 | Koh |
| 7,693,736 | B1 | 4/2010 | Chu |
| 8,400,489 | B2 | 3/2013 | Le Golf |
| 9,204,098 | B1 | 12/2015 | Cunico |
| 2003/0018659 | A1 | 1/2003 | Fuks |
| 2003/0191643 | A1 | 10/2003 | Belenger |
| 2004/0230651 | A1 | 11/2004 | Ivashin |
| 2005/0027800 | A1 | 2/2005 | Erickson |
| 2005/0209848 | A1 | 9/2005 | Ishii |
| 2006/0031326 | A1 | 2/2006 | Ovenden |
| 2006/0106872 | A1 | 5/2006 | Leban |
| 2006/0224430 | A1 | 10/2006 | Butt |
| 2006/0282266 | A1 | 12/2006 | Lopez-Barquilla |
| 2007/0106724 | A1 | 5/2007 | Gorti et al. |
| 2007/0106931 | A1 | 5/2007 | Vartiainen |
| 2008/0022209 | A1 | 1/2008 | Lyle |
| 2008/0040187 | A1 | 2/2008 | Carraher |
| 2009/0006161 | A1 | 1/2009 | Chen |
| 2009/0094088 | A1 | 4/2009 | Chen |
| 2009/0199113 | A1 | 8/2009 | McWhinnie |
| 2009/0271438 | A1 | 10/2009 | Agapi |
| 2010/0085415 | A1 | 4/2010 | Rahman |
| 2010/0198644 | A1 | 8/2010 | Renfro |
| 2010/0220172 | A1 | 9/2010 | Michaelis |
| 2010/0268534 | A1 | 10/2010 | Kishan et al. |
| 2010/0268656 | A1 | 10/2010 | Teicher |
| 2010/0318399 | A1 | 12/2010 | Li et al. |
| 2011/0087491 | A1 | 4/2011 | Wittenstein |
| 2011/0246172 | A1 | 10/2011 | Liberman |
| 2011/0282648 | A1 | 11/2011 | Sarikaya |
| 2012/0050197 | A1 | 3/2012 | Kemmochi |
| 2012/0166532 | A1 | 6/2012 | Juan |
| 2012/0271676 | A1 | 10/2012 | Aravamudan |
| 2012/0296914 | A1 | 11/2012 | Romanov |
| 2013/0006693 | A1 | 1/2013 | Haynes |
| 2013/0036117 | A1* | 2/2013 | Fisher .............. G06F 17/30029 707/736 |
| 2013/0063542 | A1 | 3/2013 | Bhay et al. |
| 2013/0073329 | A1 | 3/2013 | Shoham |
| 2013/0132480 | A1 | 5/2013 | Tsuji |
| 2013/0144603 | A1 | 6/2013 | Lord |
| 2013/0275164 | A1 | 10/2013 | Gruber |
| 2013/0282421 | A1 | 10/2013 | Graff |
| 2013/0325972 | A1 | 12/2013 | Boston et al. |
| 2014/0012926 | A1 | 1/2014 | Narayanan |
| 2014/0067390 | A1 | 3/2014 | Webb |
| 2014/0082100 | A1 | 3/2014 | Sammon et al. |
| 2014/0278377 | A1 | 9/2014 | Peters et al. |
| 2014/0320586 | A1 | 10/2014 | Tan |
| 2014/0365203 | A1 | 12/2014 | Waibel |
| 2015/0066505 | A1 | 3/2015 | Baker |
| 2015/0067047 | A1 | 3/2015 | Fu |
| 2015/0106146 | A1 | 4/2015 | Higaki |
| 2015/0120278 | A1 | 4/2015 | Waibel |
| 2015/0154183 | A1 | 6/2015 | Kristajansson |
| 2015/0154291 | A1 | 6/2015 | Shepherd |
| 2015/0170051 | A1 | 6/2015 | Bufe, III et al. |
| 2015/0181020 | A1* | 6/2015 | Fitzsimmons .... H04M 3/42221 379/67.1 |
| 2016/0071065 | A1 | 3/2016 | Ohashi |
| 2016/0092578 | A1 | 3/2016 | Ganani |
| 2016/0283676 | A1 | 9/2016 | Lyon |
| 2017/0132518 | A1 | 5/2017 | Kitada |
| 2017/0134446 | A1 | 5/2017 | Kitada |
| 2017/0213192 | A1 | 7/2017 | Kitada |
| 2017/0213193 | A1 | 7/2017 | Kitada |
| 2018/0101281 | A1 | 4/2018 | Nelson |
| 2018/0101760 | A1 | 4/2018 | Nelson |
| 2018/0101761 | A1 | 4/2018 | Nelson |
| 2018/0101823 | A1 | 4/2018 | Nelson |
| 2018/0101824 | A1 | 4/2018 | Nelson |
| 2019/0108221 | A1 | 4/2019 | Nelson |
| 2019/0108492 | A1 | 4/2019 | Nelson |
| 2019/0108493 | A1 | 4/2019 | Nelson |
| 2019/0108494 | A1 | 4/2019 | Nelson |
| 2019/0108834 | A1 | 4/2019 | Nelson |

FOREIGN PATENT DOCUMENTS

| | | |
|---|---|---|
| JP | 08-316953 | 11/1996 |
| JP | H10-269232 | 10/1998 |
| JP | 2001175720 A | 6/2001 |
| JP | 2002-207753 | 7/2002 |
| JP | 2004-112518 | 8/2004 |
| JP | 2005-277462 | 10/2005 |
| JP | 2005346515 A | 12/2005 |
| JP | 2006-085440 | 3/2006 |
| JP | 2007-336344 | 12/2007 |
| JP | 2008-099330 | 4/2008 |
| JP | 2008-152527 | 7/2008 |
| JP | 2014-143668 | 8/2014 |
| JP | 2015-154315 | 8/2015 |
| WO | WO 2016/00010 A1 | 1/2016 |

OTHER PUBLICATIONS

Nelson, U.S. Appl. No. 15/290,856, filed Oct. 11, 2016, Office Action, dated May 31, 2018.
Kitada, U.S. Appl. No. 15/477,276, filed Apr. 3, 2017, Office Action, dated Dec. 1, 2017.
Kitada, U.S. Appl. No. 15/477,276, filed Apr. 3, 2017, Ex Parte Quaye, Apr. 20, 2018.
Kitada, U.S. Appl. No. 15/477,240, filed Apr. 3, 2018, Notice of Allowance, dated May 1, 2018.
Kitada, U.S. Appl. No. 15/477,240, filed Apr. 3, 2017, Office Action, dated Dec. 1, 2017.
Kitada, U.S. Appl. No. 14/992,273, filed Jan. 11, 2016, Notice of Allowance, dated Dec. 27, 2016.
Kitada, U.S. Appl. No. 15/477,276, filed Apr. 3, 2017, Office Action, dated Aug. 29, 2018.
Wikipedia, the Free Encyclopedia, "Watson (Computer", https://en.wikipedia.org/wiki/Watson_(computer), last viewed on Feb. 23, 2016, 16 pages.
European Patent Office, "Search Report" in application No. 17194726.0-1222, dated Jan. 16, 2018, 7 pages.
European Patent Office, "Search Report" in application No. 17192809.6-1958, dated Dec. 6, 2017, 9 pages.
European Patent Office, "Search Report" in application No. 16196514.0-1871, dated Jan. 30, 2017, 6 pages.

(56) References Cited

OTHER PUBLICATIONS

European Patent Office, "Search Report" in application No. 16194599.3-1502, dated Apr. 3, 2017, 7 pages.
European Patent Office, "Search Report" in application No. 18196734.0-1230, dated Feb. 21, 2019, 9 pages.
Tur et al., "The Calo Meeting Assistant System", IEEE Transactions on Audio, Speech and Language Processing, vol. 18, No. 6, Digital Object Identifier 10.1109/TASL, dated Aug. 2010, 11 pages.
Nelson, U.S. Appl. No. 15/728,367, filed Oct. 9, 2017, Office Action, dated Jan. 24, 2019.
Nelson, U.S. Appl. No. 15/728, filed Oct. 9, 2017, Office Action, dated Feb. 25, 2019.
Kitada, U.S. Appl. No. 14/992,278, filed Jan. 11, 2016, Final Office Action, dated Jan. 15, 2019.
Nelson, U.S. Appl. No. 15/728,367, filed Oct. 9, 2017, Final Office Action, dated May 3, 2019.
Nelson, U.S. Appl. No. 15/728,367, filed Oct. 9, 2017, Advisory Action, dated May 17, 2019.
Nelson, U.S. Appl. No. 15/290,860, filed Oct. 11, 2016, Notice of Allowance, dated May 21, 2019.
Nelson, U.S. Appl. No. 15/290,858, filed Oct. 11, 2016, Office Action, dated May 1, 2019.
Nelosn, U.S. Appl. No. 15/290,855, filed Oct. 11, 2016, Final Office Action, dated May 1, 2019.
Nelson, U.S. Appl. No. 15/728,368, filed Oct. 9, 2017, Final Office Action, dated Jun. 19, 2019.
Nelson, U.S. Appl. No. 15/290,855, filed Oct. 11, 2016, Advisory Action, dated Jun. 20, 2019.
Kitada, U.S. Appl. No. 14/992,278, filed Jan. 11, 2016, Office Action, dated Jul. 30, 2019.
The State Intellectual Property Office of P.R. China, "The Notification of the First Office Action", in application No. 2016109747584, dated Jul. 3, 2019, 17 pages.

\* cited by examiner

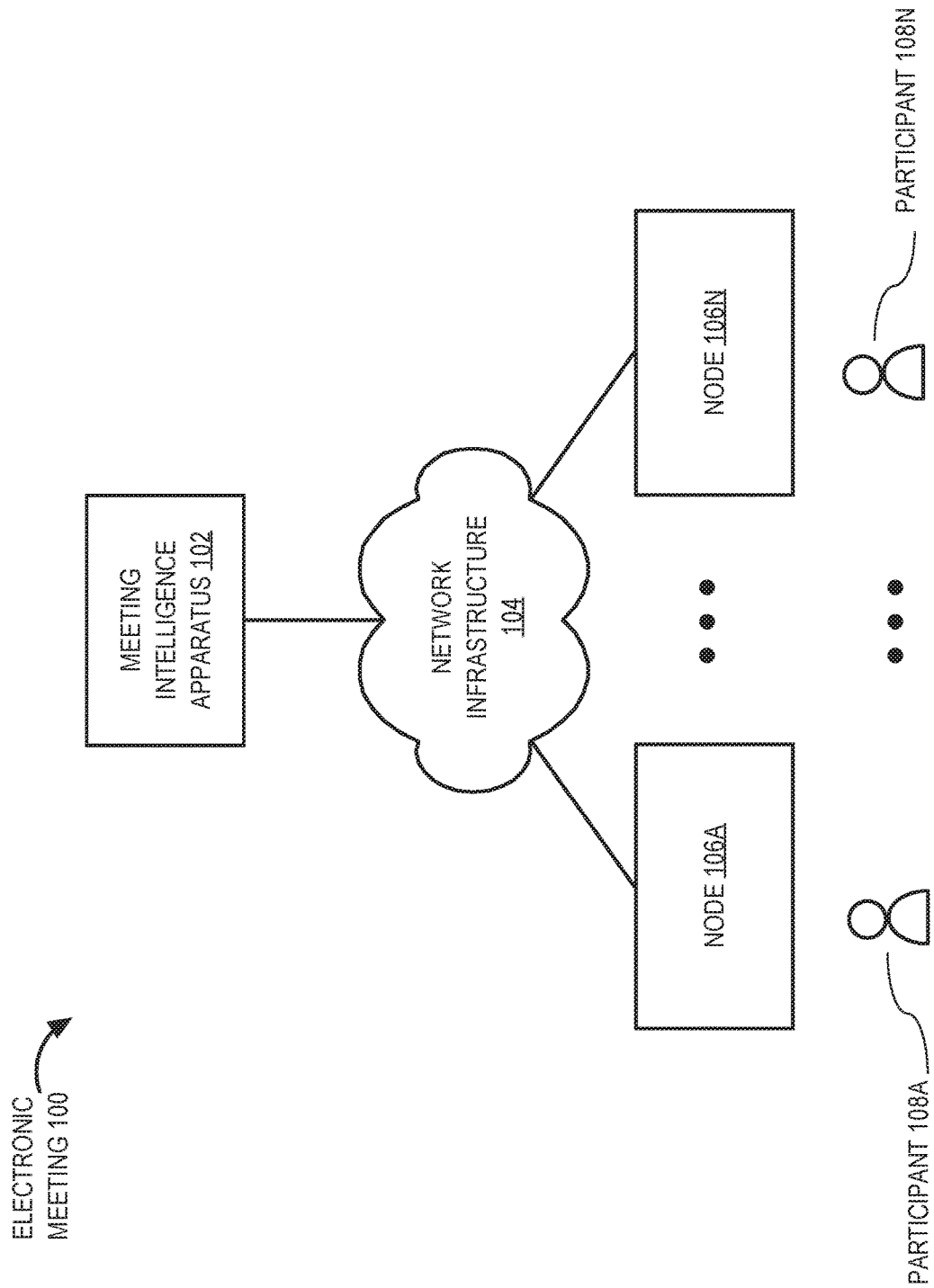

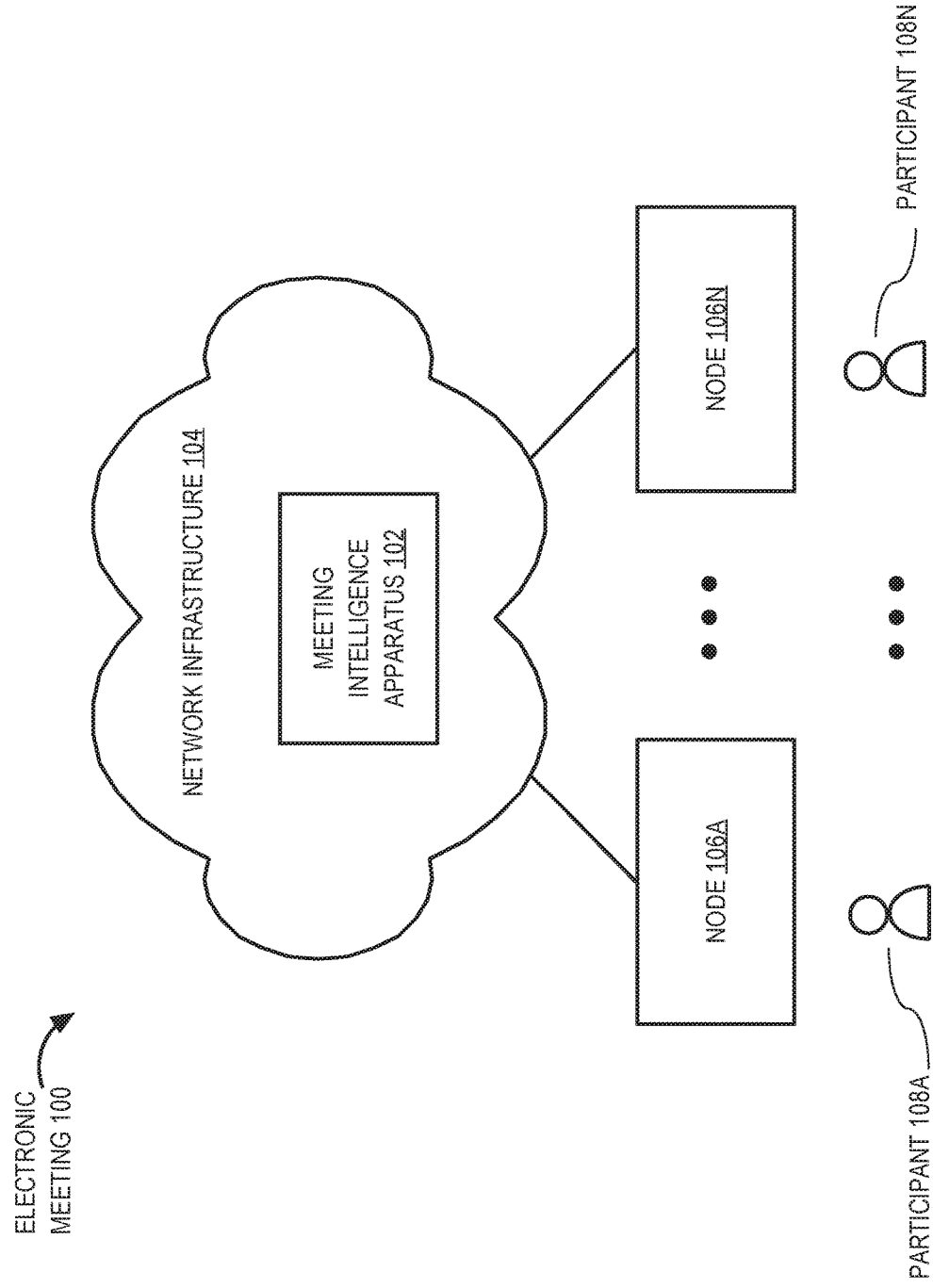

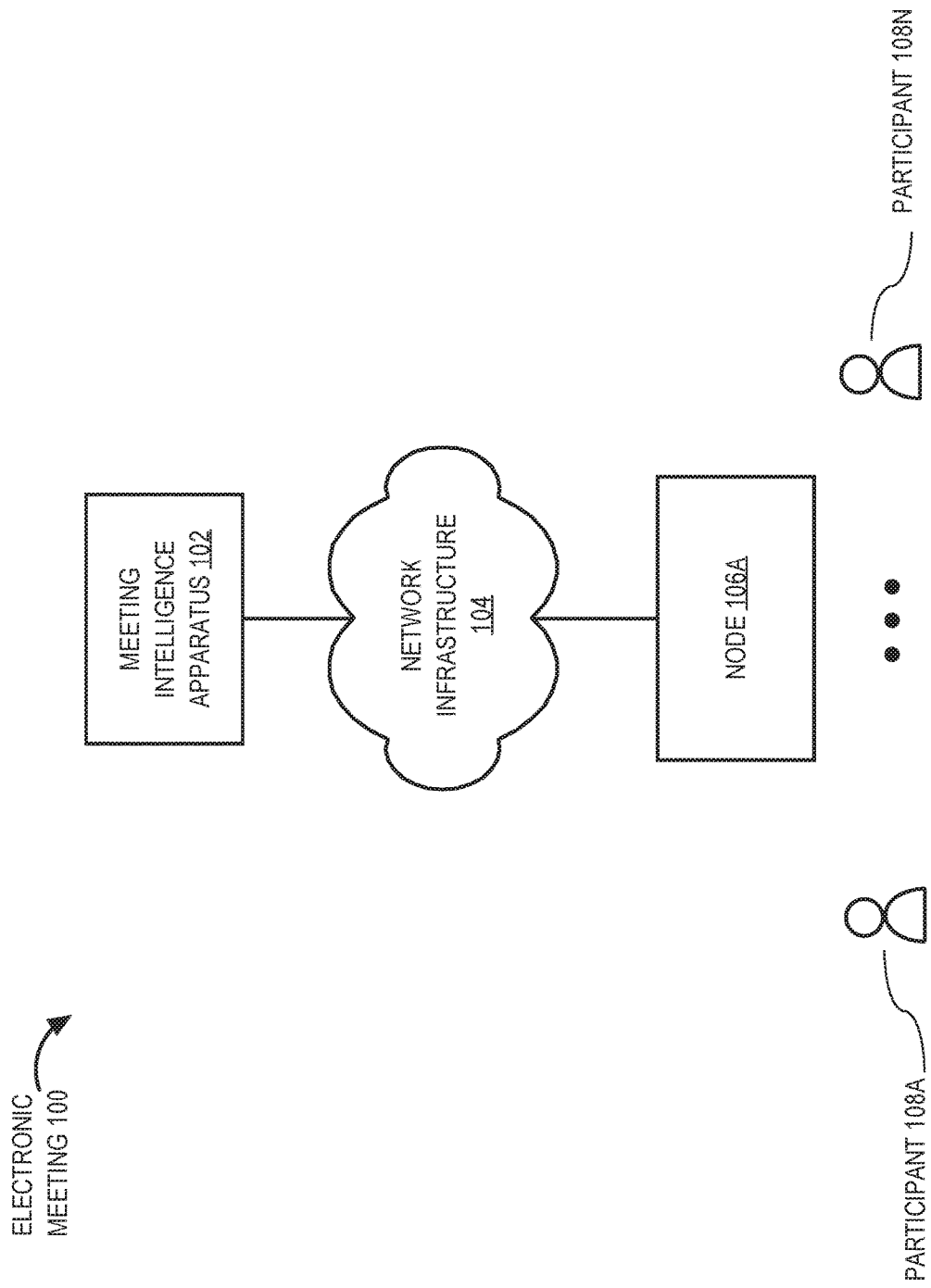

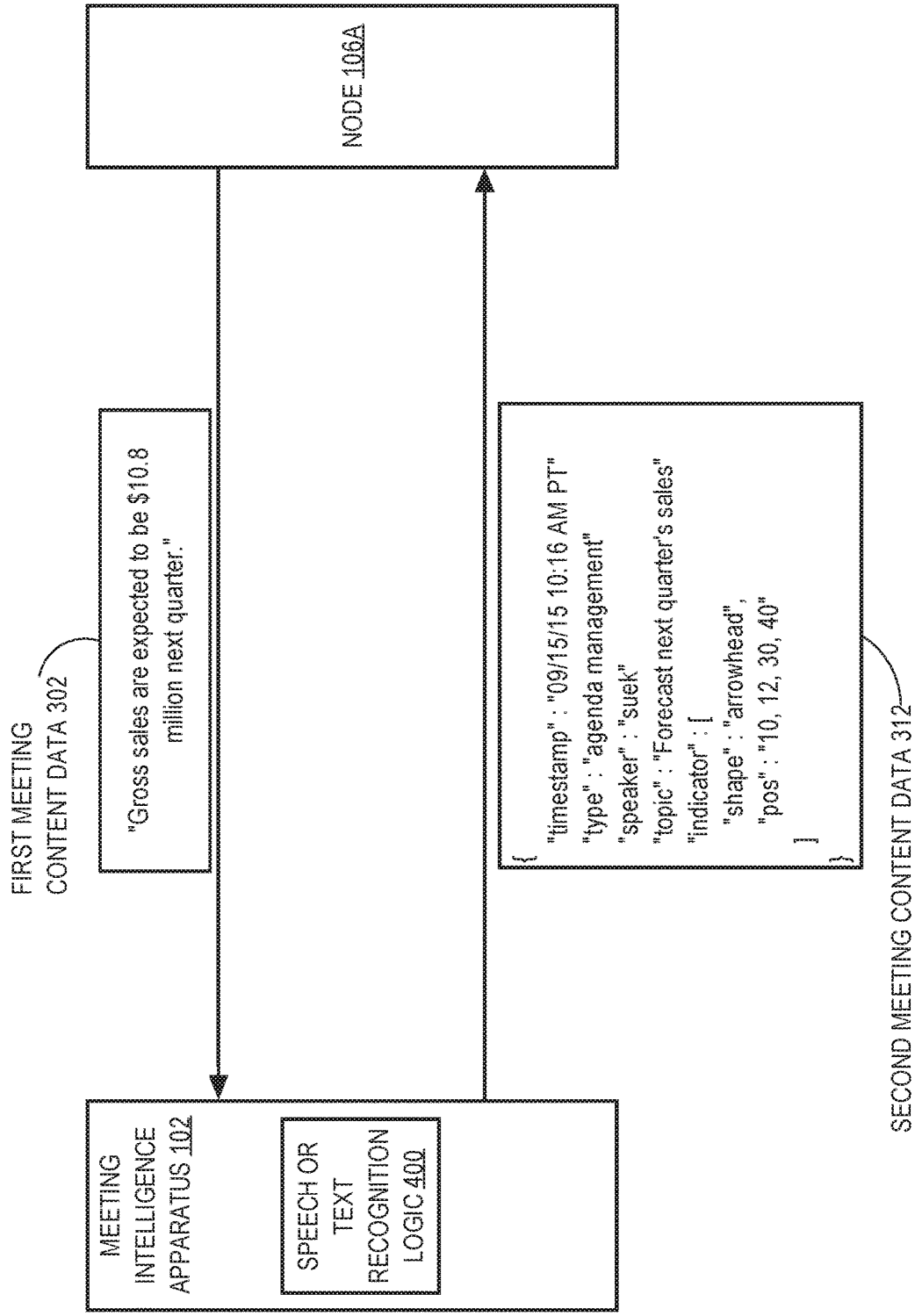

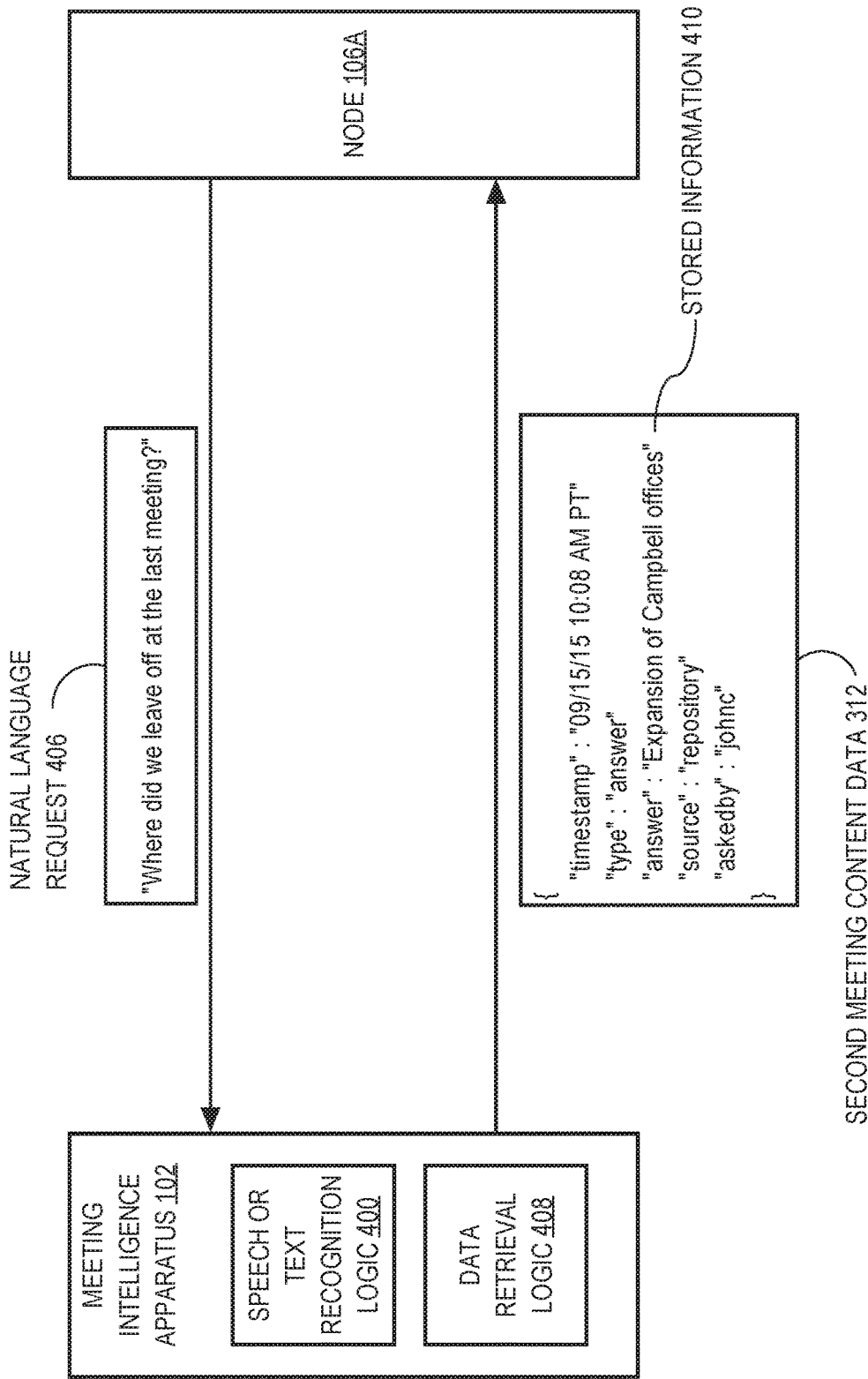

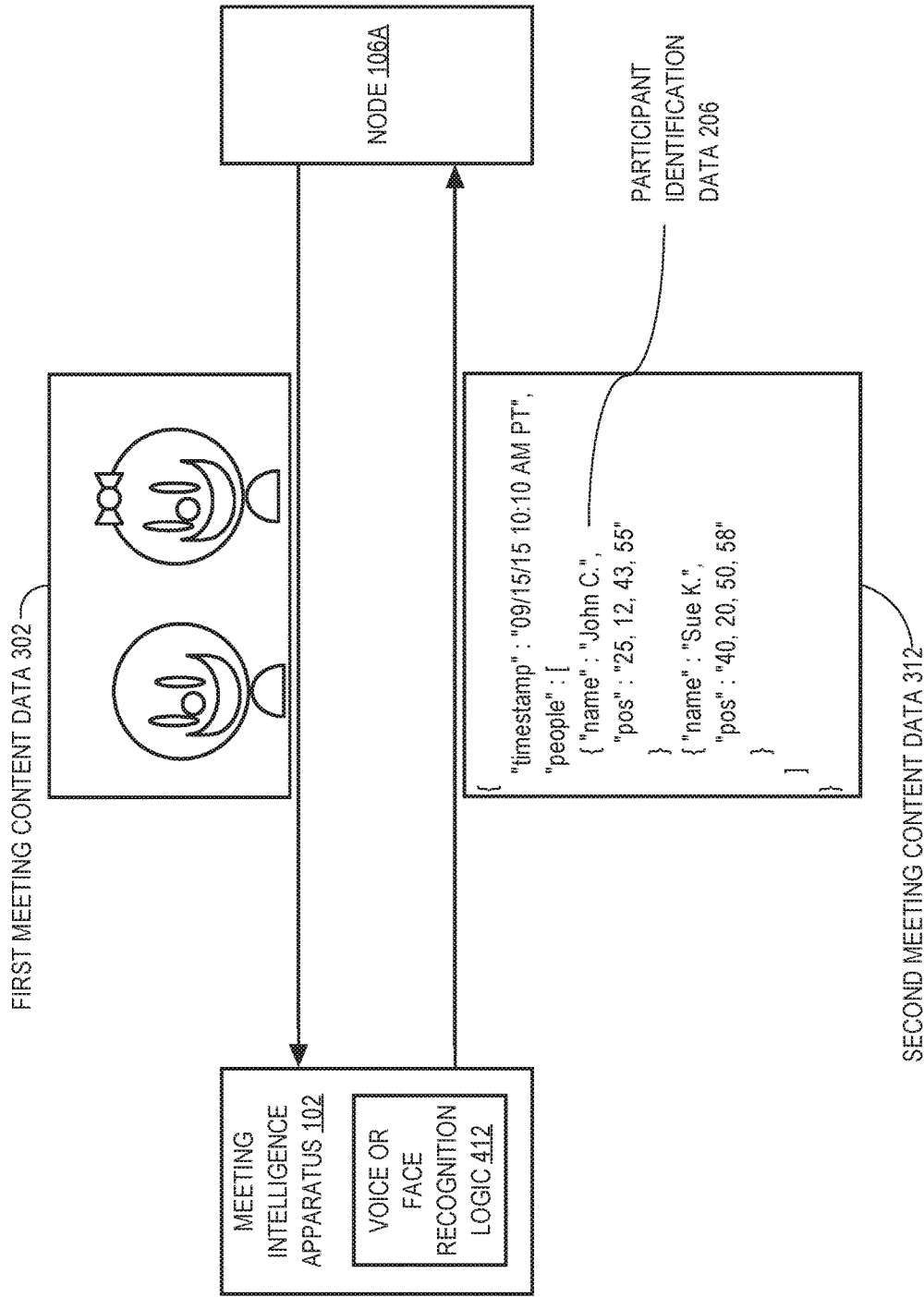

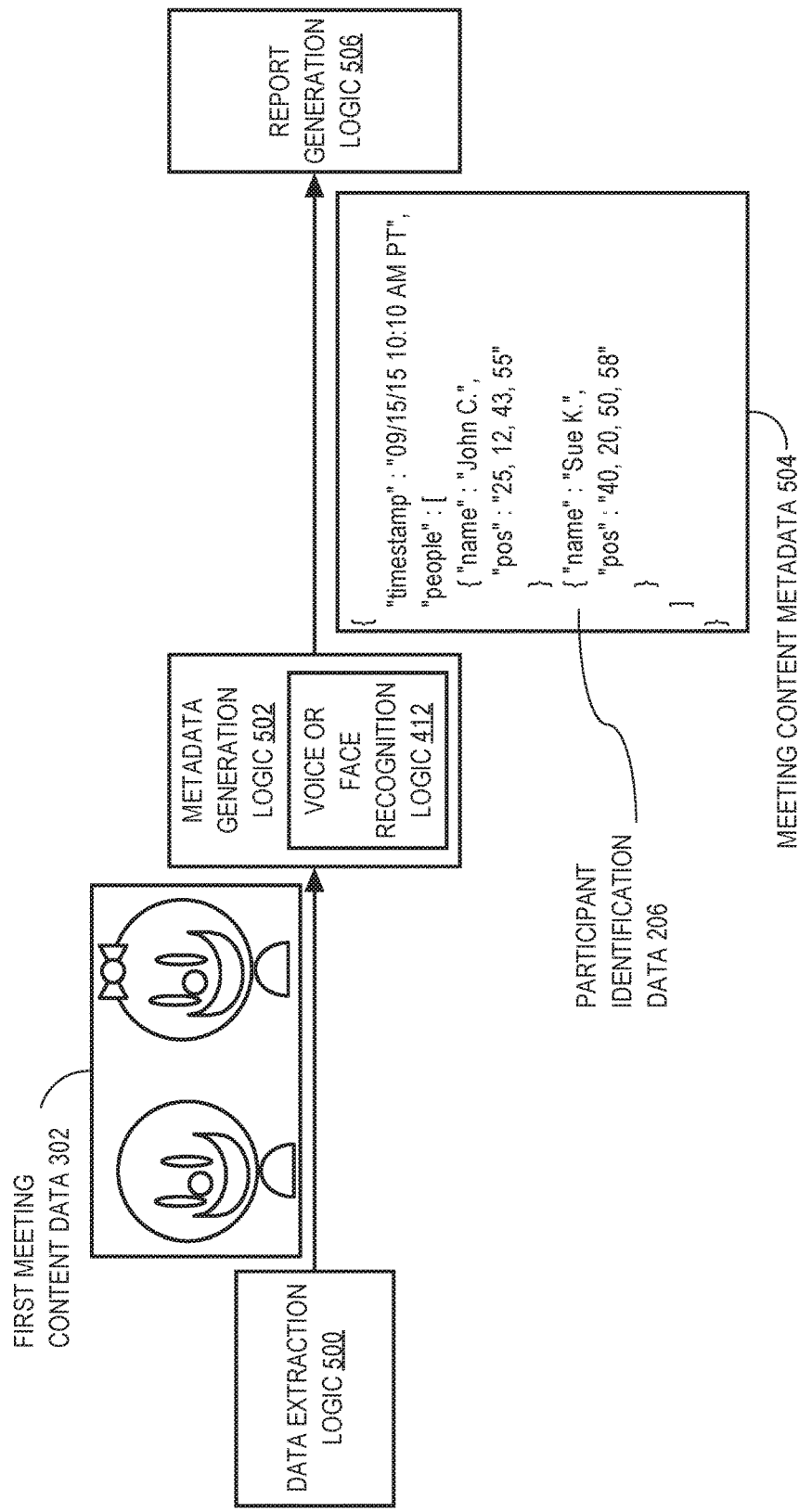

FIG. 7A

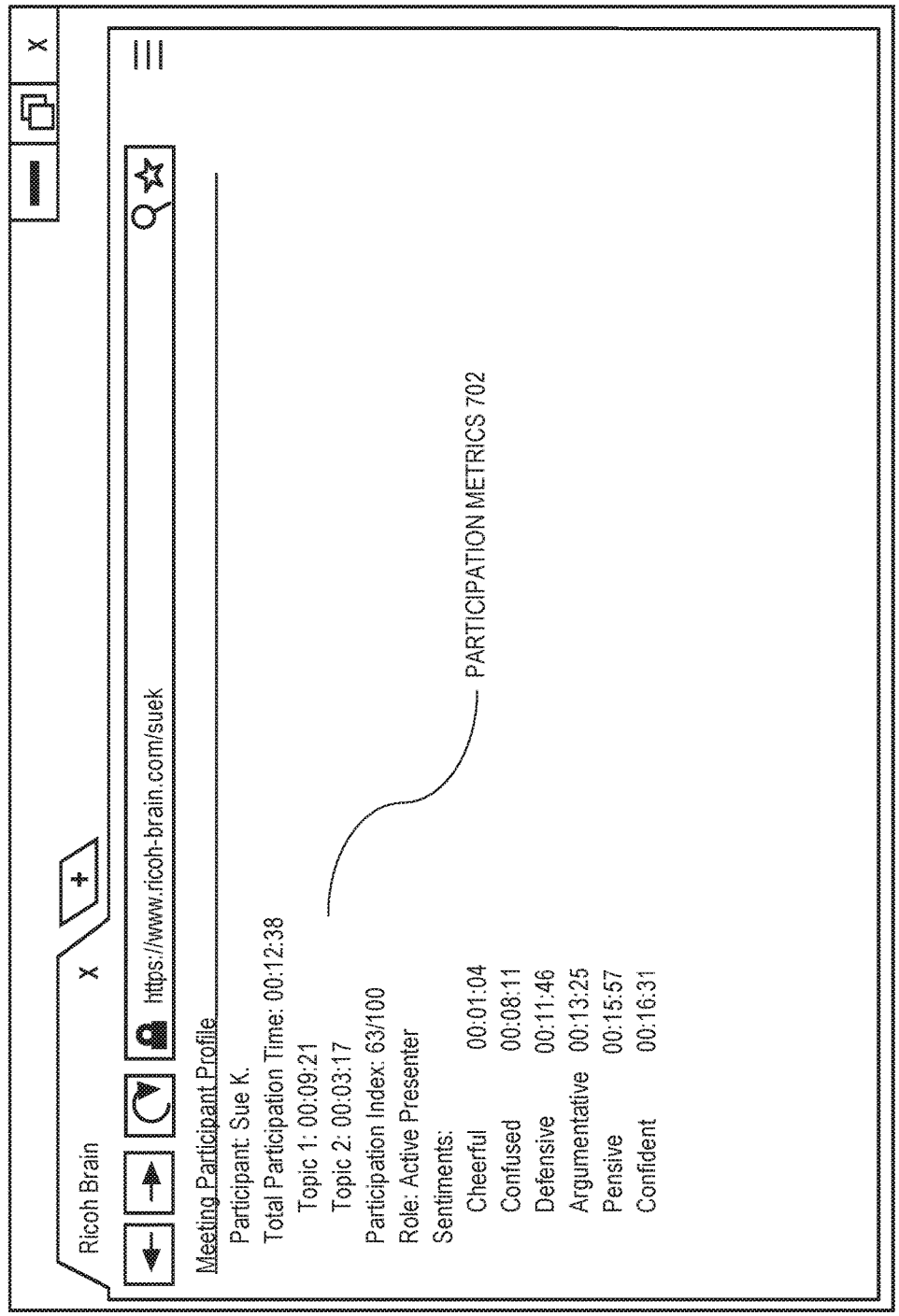

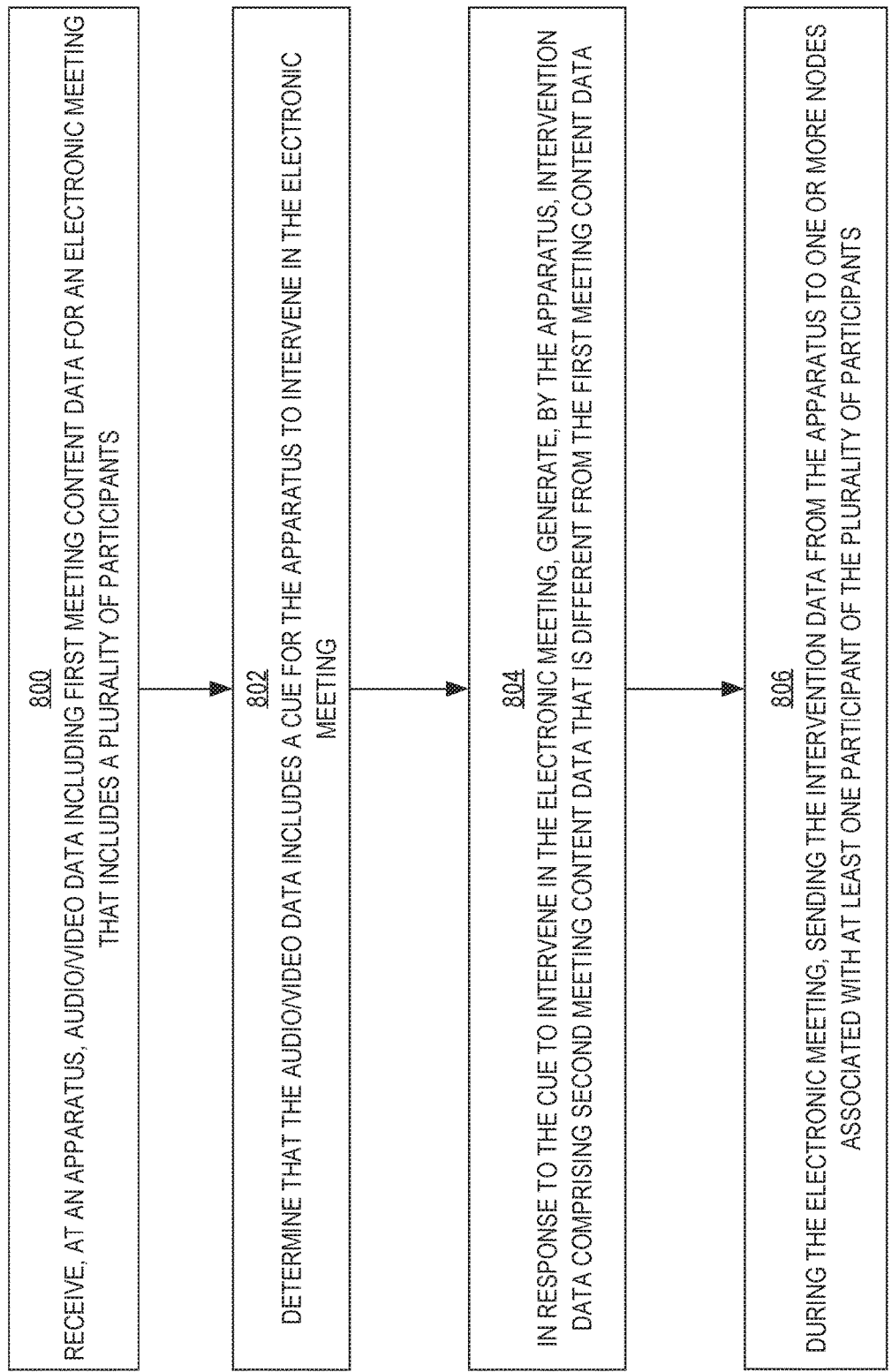

ELECTRONIC MEETING INTELLIGENCE

PRIORITY CLAIM

This application is a Continuation of prior U.S. patent application Ser. No. 15/477,240 entitled "Electronic Meeting Intelligence", filed Apr. 3, 2017, which is a Continuation of prior U.S. patent application Ser. No. 14/992,273 entitled "Electronic Meeting Intelligence", filed Jan. 11, 2016, which claims the benefit of a Provisional Application No. 62/253,325 entitled "Electronic Meeting Intelligence", filed Nov. 10, 2015, the entire contents all of which are hereby incorporated by reference as if fully set forth herein, under 35 U.S.C. § 119(e).

This application is related to:
- U.S. patent application Ser. No. 15/477,276 entitled "Electronic Meeting Intelligence", filed Apr. 3, 2017;
- U.S. patent application Ser. No. 14/992,278 entitled "Electronic Meeting Intelligence", filed Jan. 11, 2016;
- U.S. patent application Ser. No. 15/290,855 entitled "Managing Electronic Meetings Using Artificial Intelligence and Meeting Rules Templates", filed Oct. 11, 2016;
- U.S. patent application Ser. No. 15/290,856 entitled "Creating Agendas for Electronic Meetings Using Artificial Intelligence", filed Oct. 11, 2016;
- U.S. patent application Ser. No. 15/290,858 entitled "Selecting Meeting Participants for Electronic Meetings Using Artificial Intelligence", filed Oct. 11, 2016;
- U.S. patent application Ser. No. 15/290,860 entitled "Real-Time (Intra-Meeting) Processing Using Artificial Intelligence", filed Oct. 11, 2016;
- U.S. patent application Ser. No. 15/290,861 entitled "Post-Meeting Processing Using Artificial Intelligence", filed Oct. 11, 2016; the contents all of which are incorporated by reference in their entirety for all purposes as if fully set forth herein.

FIELD OF THE DISCLOSURE

Embodiments relate to artificial intelligence and more specifically, to electronic meeting intelligence.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A meeting is typically an effective vehicle for coordinating the successful accomplishment of a common goal shared by multiple people. However, a meeting can also devolve into a counterproductive use of time in the absence of proper organization of the meeting itself. For example, too much time may be devoted to a particular topic that involves a small subset of meeting attendees, and this may result in wasted time for the remaining attendees. Such circumstances may be avoided through the use of a person serving as a meeting moderator, but personal biases may affect the neutrality of the person serving as the meeting moderator. Such circumstances may also be avoided through adequate preparation for the meeting, but it may be impossible to foresee all the possible issues that may arise during the meeting.

Another way for a meeting to result in wasted time is by failing to fully reap the benefits provided by the meeting. For example, transcribing the meeting, scheduling an additional meeting, analyzing meeting participation, and/or researching an issue that was contended during the meeting may be tedious follow-up actions that are neglected after the meeting. Even if the follow-up actions are performed, the process of performing them may be slow and cost-prohibitive.

Thus, it is desirable and beneficial to perform the administrative duties related to a meeting using an approach without the aforementioned shortcomings.

SUMMARY

An apparatus includes one or more processors and one or more computer-readable media storing instructions which, when processed by the one or more processors cause the apparatus to receive audio/video data including first meeting content data for an electronic meeting that includes multiple participants. The instructions further cause the apparatus to determine that the audio/video data includes a cue for the apparatus to intervene in the electronic meeting. Further, the instructions cause the apparatus to generate, in response to the cue, intervention data including second meeting content data that is different from the first meeting content data. Still further, the instructions cause the apparatus to send, during the electronic meeting, the intervention data to one or more nodes associated with at least one participant of the multiple participants.

BRIEF DESCRIPTION OF THE DRAWINGS

In the drawings:

FIGS. 1A-C depict example computer architectures upon which embodiments may be implemented.

FIGS. 4A-D depict examples of intervention data.

FIGS. 6A-C depict examples of meeting content metadata.

FIGS. 7A-B depict example reports.

FIG. 8 is a flow diagram that depicts an approach for generating intervention data.

Figure 2:
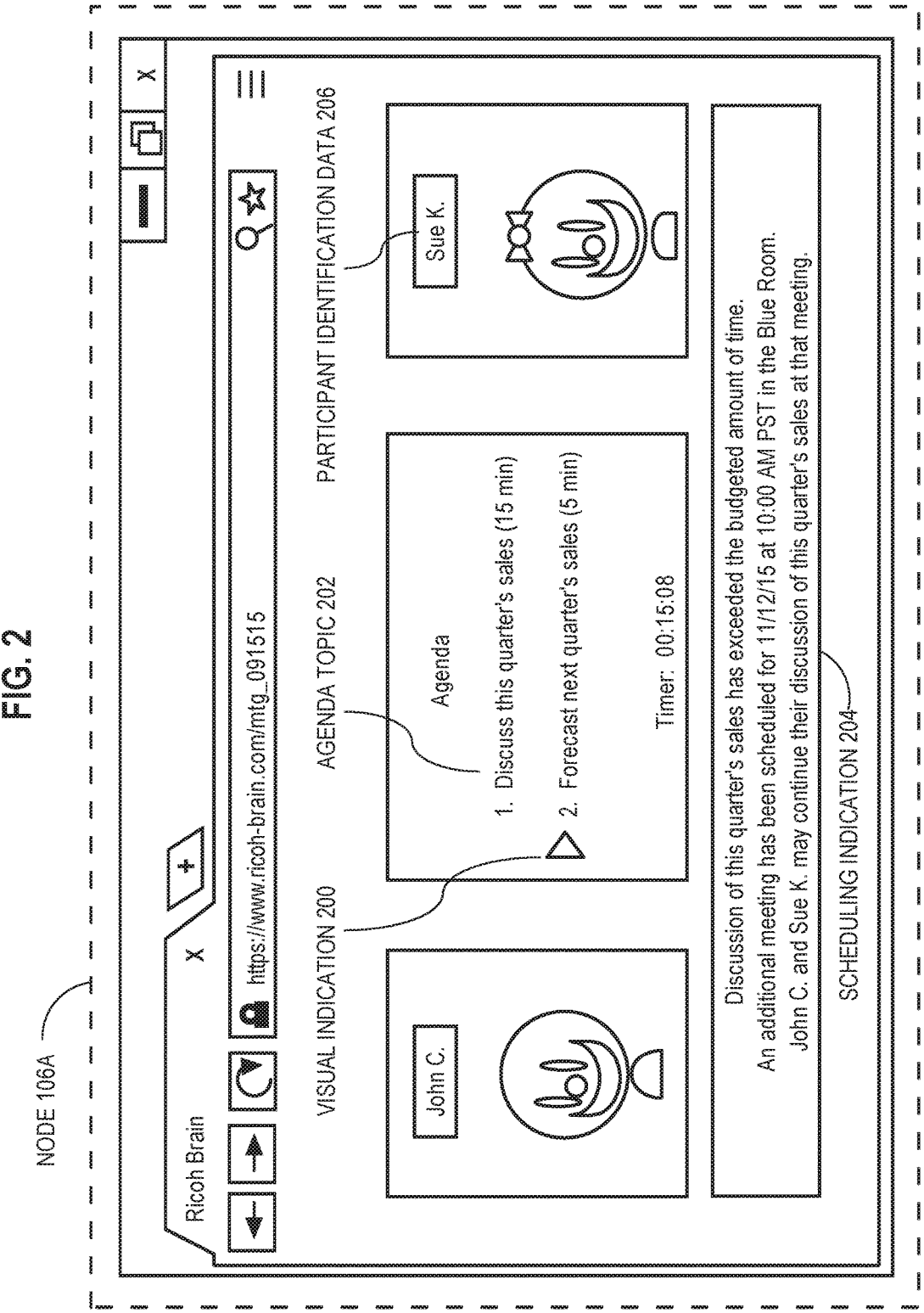
FIG. 2 depicts an example participant interface.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order.

I. GENERAL OVERVIEW
II. NETWORK TOPOLOGY
  A. MEETING INTELLIGENCE APPARATUS
  B. NETWORK INFRASTRUCTURE
  C. PARTICIPANT NODES
III. REAL-TIME PROCESSING
  A. MEETING FLOW MANAGEMENT
  B. INFORMATION RETRIEVAL SERVICES
  C. MEETING CONTENT SUPPLEMENTATION
  D. MEETING CONTENT METADATA GENERATION
IV. POST-PROCESSING
  A. MEETING CONTENT ANALYSIS
  B. MEETING SUMMARY
  C. PARTICIPANT ANALYSIS
V. PROCESS OVERVIEW
  A. GENERATING INTERVENTION DATA
  B. GENERATING REPORTS
VI. IMPLEMENTATION MECHANISMS

I. General Overview

Artificial intelligence is introduced into an electronic meeting context to perform various administrative tasks. The administrative tasks include tasks performed during an electronic meeting as well as after an electronic meeting. The artificial intelligence performs the administrative tasks based on analyzing meeting content using any of a number of input detection tools. For example, the artificial intelligence can identify meeting participants, provide translation services, respond to questions, and serve as a meeting moderator. The artificial intelligence can also include elements of its meeting content analysis in various reports. For example, the reports can include meeting transcripts, follow-up items, meeting efficiency metrics, and meeting participant analyses.

II. Network Topology

FIGS. 1A-C depict example computer architectures upon which embodiments may be implemented. FIGS. 1A-C include various arrangements of electronic meeting 100. Electronic meeting 100 includes meeting intelligence apparatus 102 and one or more nodes 106A-N communicatively coupled via network infrastructure 104. Nodes 106A-N are associated with a plurality of participants 108A-N.

Electronic meeting 100 may be an audioconferencing session, a videoconferencing session, and/or any other meeting involving data transmissions between network infrastructure 104 and at least one node 106A. Referring to FIGS. 1A-B, electronic meeting 100 includes a virtual gathering of participants 108A-N. In the examples of FIGS. 1A-B, participants 108A-N may be located in different physical locations yet communicate with each other via network infrastructure 104. Referring to FIG. 1C, electronic meeting 100 includes a physical gathering of participants 108A-N. In the example of FIG. 1C, participants 108A-N may be located in physical proximity to each other such that they may communicate with each other without network infrastructure 104. However, network infrastructure 104 may enable participants 108A-N to interact with meeting intelligence apparatus 102, which receives input data from and/or sends output data to node 106A.

In an embodiment, electronic meeting 100 involves a network of computers. A "computer" may be one or more physical computers, virtual computers, and/or computing devices. A computer may be a client and/or a server. Any reference to "a computer" herein may mean one or more computers, unless expressly stated otherwise. Each of the logical and/or functional units depicted in any of the figures or described herein may be implemented using any of the techniques further described herein in connection with FIG. 10.

A. Meeting Intelligence Apparatus

In an embodiment, meeting intelligence apparatus 102 is a computer endowed with artificial intelligence. The computer may be a special-purpose computer dedicated to providing artificial intelligence to electronic meetings or a generic computer executing one or more services that provide artificial intelligence to electronic meetings. In other words, meeting intelligence may be implemented using hardware, software, and/or firmware. Non-limiting examples include Ricoh Brain and IBM Watson. Meeting intelligence apparatus 102 may always be available (e.g., involve continuously running processes) or may be available on demand (e.g., be powered on when needed). For example, meeting intelligence apparatus 102 may be replicated over multiple computers such that at any point in time, at least one computer can provide meeting intelligence services.

Meeting intelligence apparatus 102 can access meeting content data as if it were a node associated with a participant in electronic meeting 100. Thus, meeting intelligence apparatus 102 may access any meeting content data that is transmitted from any of the one or more nodes 106A-N involved in electronic meeting 100. For example, meeting intelligence apparatus 102 may monitor, collect, and/or analyze all data transmissions during electronic meeting 100.

Meeting intelligence apparatus 102 can analyze meeting content data using any of a number of tools, such as speech or text recognition, voice or face identification, sentiment analysis, object detection, gestural analysis, thermal imaging, etc. Based on analyzing the meeting content data, meeting intelligence apparatus 102 performs any of a number of automated tasks, such as providing a translation, responding to an information request, moderating electronic meeting 100, generating a report, etc.

Meeting intelligence apparatus 102 may be located at a number of different locations relative to network infrastructure 104. Referring to FIGS. 1A and 1C, meeting intelligence apparatus 102 is located outside network infrastructure 104. Referring to FIG. 1B, meeting intelligence apparatus 102 is collocated with at least some of network infrastructure 104.

In an embodiment, meeting intelligence apparatus 102 is communicatively coupled to a meeting repository (not shown). The meeting repository may be part of meeting intelligence apparatus 102 or may be located on a separate device from meeting intelligence apparatus 102. The meeting repository may be a database, a configuration file, and/or any other system or data structure that stores meeting data related to one or more electronic meetings. For example, meeting intelligence apparatus 102 may collect and store, in the meeting repository, meeting content data related to multiple meetings. In other words, meeting intelligence apparatus 102 can provide the services of a librarian for meeting-related data.

Like meeting intelligence apparatus 102, the meeting repository may be located at a number of different locations relative to network infrastructure 104. For example, the meeting repository may be a data structure stored in memory on one or more computers of network infrastructure 104.

In an embodiment, meeting intelligence apparatus 102 is communicatively coupled to any of a number of external data sources (not shown), such as websites or databases managed by Salesforce, Oracle, SAP, Workday, or any entity other than the entity managing meeting intelligence apparatus 102. Meeting intelligence apparatus 102 may be communicatively coupled to the external data sources via network infrastructure 104. The external data sources may provide meeting intelligence apparatus 102 with access to any of a variety of data, meeting-related or otherwise.

B. Network Infrastructure

Network infrastructure 104 may include any number and type of wired or wireless networks, such as local area networks (LANs), wide area networks (WANs), the Internet, etc. Network infrastructure 104 may also include one or more computers, such as one or more server computers, load-balancing computers, cloud-based computers, data centers, storage devices, and/or any other special-purpose computing devices. For example, network infrastructure 104 may include a Unified Communication System (UCS) Service Platform by Ricoh Company Ltd., and/or any other computer(s) that manage(s) electronic meeting 100.

C. Participant Nodes

Each node of the one or more nodes 106A-N is associated with one or more participants 108A-N. Each participant is a person who participates in electronic meeting 100. Each node processes data transmission between network infrastructure 104 and at least one participant. Multiple nodes 106A-N may be communicatively coupled with each other using any of a number of different configurations. For example, multiple nodes may be communicatively coupled with each other via a centralized server or via a peer-to-peer network.

In an embodiment, a node includes a computer that executes an electronic meeting application. The node may include a special-purpose computer, such as Ricoh UCS P3500, or a general-purpose computer that executes a special-purpose application, such as Ricoh UCS App. The node may also include any of a number of input/output mechanisms, such as a camera, a microphone, and an electronic whiteboard. For example, the node may include a smartphone with GPS capability, a camera, a microphone, an accelerometer, a touchscreen, etc.

The input/output mechanisms may include a participant interface, such as a graphical user interface (GUI). FIG. 2 depicts an example participant interface that is presented at node 106A. Referring to FIG. 2, node 106A includes a web-based interface that presents a variety of information to a participant during electronic meeting 100. The web-based interface of FIG. 2 displays video streams including participant identification data 206 associated with other participants, a meeting agenda managed by meeting intelligence apparatus 102, and a message including scheduling indication 204. The meeting agenda includes agenda topic 202 and visual indication 200 of a current agenda topic. As shall be described in greater detail hereafter, meeting intelligence apparatus 102 provides visual indication 200, scheduling indication 204, and/or participant identification data 206 based on analyzing meeting content data.

III. Real-Time Processing

Figure 3:
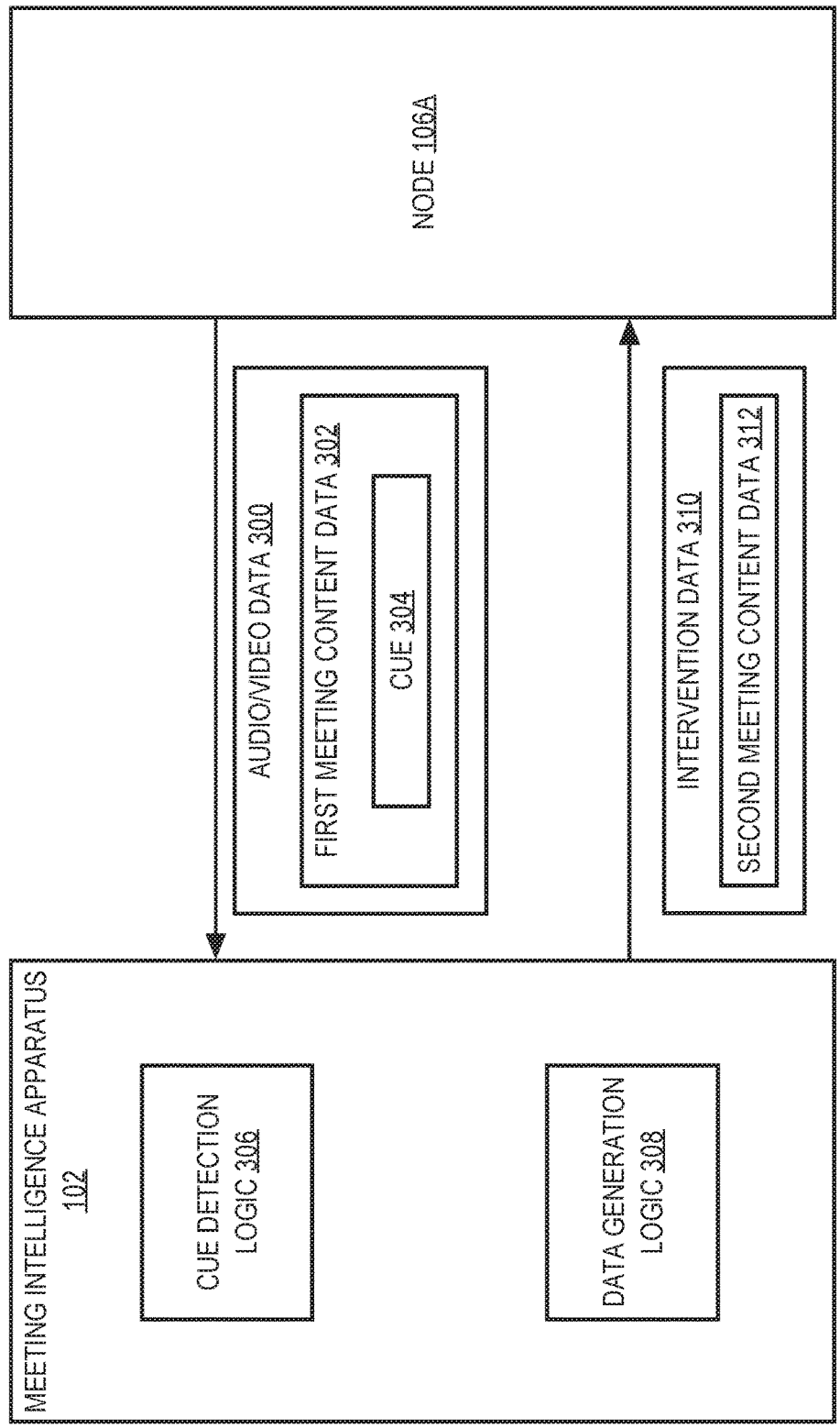
FIG. 3 is a block diagram that depicts an arrangement for generating intervention data.

Meeting intelligence apparatus 102 can intervene during electronic meeting 100 to provide any of a variety of intervention data, such as visual indication 200, scheduling indication 204, participant identification data 206, recommendation information, and/or any other data that meeting intelligence apparatus 102 transmits during electronic meeting 100. FIG. 3 is a block diagram that depicts an arrangement for generating intervention data. Referring to FIG. 3, meeting intelligence apparatus 102 receives audio/video data 300 from node 106A. Audio/video data 300 may be one or more data packets, a data stream, and/or any other form of data that includes audio and/or video information related to electronic meeting 100. Audio/video data 300 includes first meeting content data 302 which, in turn, includes cue 304. Meeting intelligence apparatus 102 includes cue detection logic 306, which determines whether audio/video data 300 includes cue 304. Meeting intelligence apparatus 102 also includes data generation logic 308, which generates intervention data 310 if audio/video data 300 includes cue 304. Meeting intelligence apparatus 102 sends intervention data 310 to node 106A during electronic meeting 100. Intervention data 310 includes second meeting content data 312.

Meeting intelligence apparatus 102 can intervene in electronic meeting 100 in any of a number of ways. Non-limiting examples include intervening to manage meeting flow, to provide information retrieval services, and/or to supplement meeting content.

A. Meeting Flow Management

Figure 4B:
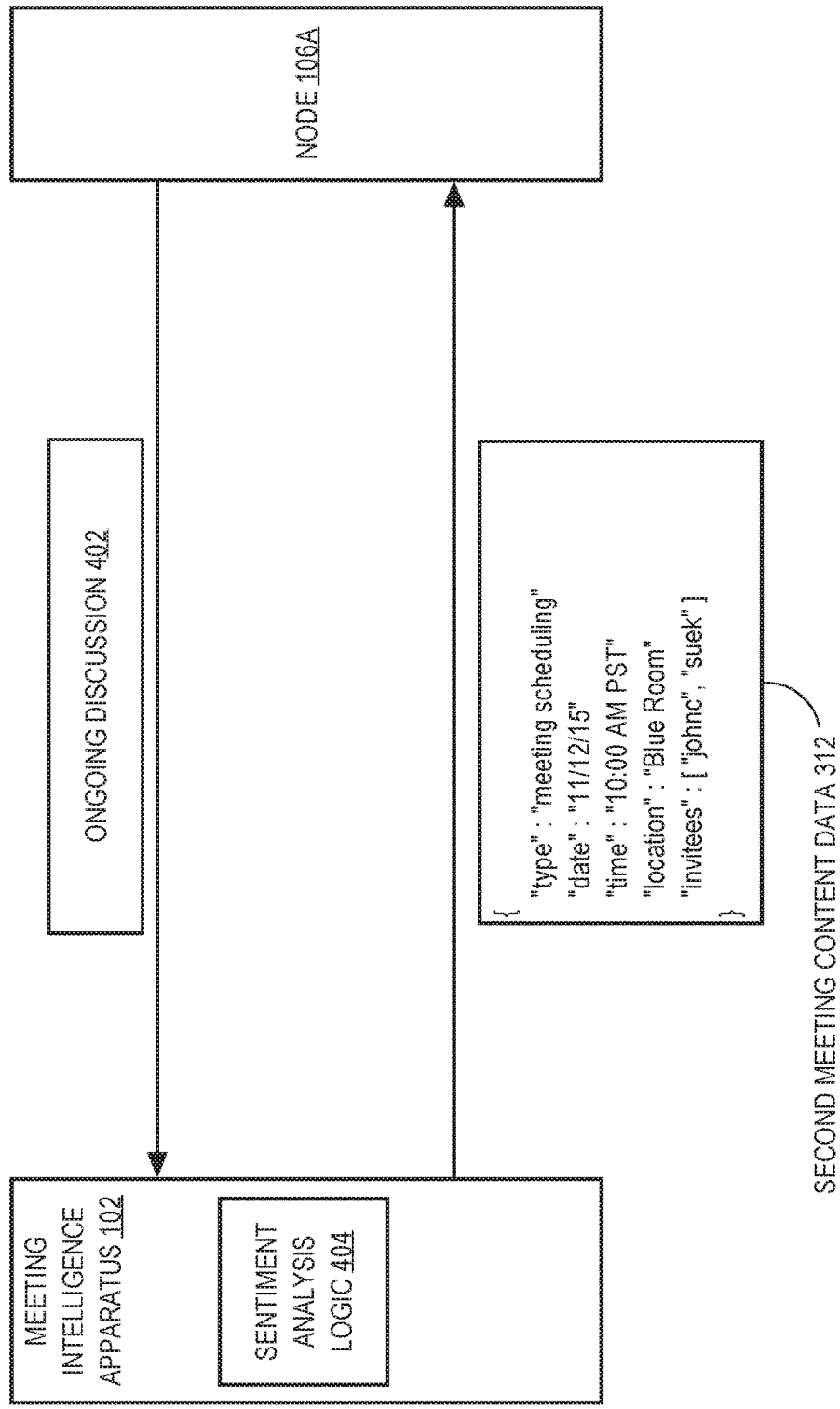

FIGS. 4A-B are block diagrams that depict arrangements for managing meeting flow. Meeting intelligence apparatus 102 can manage meeting flow in any of a number of ways. For example, meeting intelligence apparatus 102 can ensure that electronic meeting 100 follows a predetermined meeting schedule, such as a flowchart or a meeting agenda with a respective time limit for each agenda topic 202. Additionally or alternatively, meeting intelligence apparatus 102 can defuse a heated situation before it affects the progress of electronic meeting 100.

FIG. 4A is a block diagram that depicts an arrangement for performing speech or text recognition to determine that audio/video data 300 is related to a particular agenda topic. Referring to FIG. 4A, first meeting content data 302 includes the speech or text statement "Gross sales are expected to be $10.8 million next quarter." For example, a participant associated with node 106A may have caused first meeting content data 302 to be generated by speaking, writing, typing, or displaying the statement. Meeting intelligence apparatus 102 includes speech or text recognition logic 400, which parses first meeting content data 302 and detects at least the keywords "next quarter". The keywords are a cue 304 for meeting intelligence apparatus 102 to generate intervention data 310 that indicates the appropriate agenda topic. For example, intervention data 310 may cause a continued indication of the current agenda topic or cause an indication of a different agenda topic. In the example of FIG. 4A, second meeting content data 312 specifies, among other information, the position of visual indication 200 using JavaScript Object Notation (JSON). Thus, one or more nodes 106A-N that process the JSON will display visual indication 200 at the specified position in the meeting agenda during electronic meeting 100.

FIG. 4B is a block diagram that depicts an arrangement for performing sentiment analysis to detect an ongoing discussion 402 to be interrupted. Referring to FIG. 4B, meeting intelligence apparatus 102 includes sentiment analysis logic 404, which performs sentiment analysis on first meeting content data 302 related to ongoing discussion 402. For example, meeting intelligence apparatus 102 may detect an angry tone or sentiment that is a cue 304 for meeting intelligence apparatus 102 to generate intervention data 310 indicating that another electronic meeting has been automatically scheduled for continuing ongoing discussion 402. In the example of FIG. 4B, second meeting content data 312 includes JSON from which scheduling indication 204 can be generated during electronic meeting 100.

Meeting intelligence apparatus 102 may use a timer or counter in conjunction with any combination of elements from the foregoing examples. For example, after meeting intelligence apparatus 102 detects a discussion of a particular agenda topic, meeting intelligence apparatus 102 may compare a timer value to a predetermined time limit for the particular agenda topic. If the timer value exceeds the predetermined time limit, meeting intelligence apparatus 102 may cause scheduling indication 204 to be generated. Additionally or alternatively, meeting intelligence apparatus 102 may cause visual indication 200 of a different agenda topic.

B. Information Retrieval Services

Meeting intelligence apparatus 102 can provide information retrieval services in a user-friendly manner. Significantly, a participant of electronic meeting 100 may formulate an information request in a natural language instead of a computer language, such as Structured Query Language (SQL).

FIG. 4C is a block diagram that depicts an arrangement for retrieving requested information. Referring to FIG. 4C, meeting intelligence apparatus 102 receives natural language request 406, which includes the question "Where did we leave off at the last meeting?" Note that natural language request 406 may include a question, a statement, a command, or any other type of request for information. Speech or text recognition logic 400 parses and interprets first meeting content data 302 to detect natural language request 406, which is a cue 304 for meeting intelligence apparatus 102 to generate intervention data 310 to be sent to at least node 106A during electronic meeting 100. For example, speech or text recognition logic 400, alone or in combination with sentiment analysis logic 404, may detect inflected speech and/or keywords indicative of an information request, such as "who", "what", "when", "where", "why", or "how". Meeting intelligence apparatus 102 can interpret these and other keywords as commands to perform requested functions, such as data retrieval.

In the example of FIG. 4C, meeting intelligence apparatus 102 may interpret the question as a command to search and analyze prior meeting data to determine an answer to the question. Determining the answer to the question may involve analyzing meeting content data related to an ongoing meeting and/or a prior meeting, thereby increasing the relevancy of the answer to the question. For example, the question "Where did we leave off at the last meeting?" may be analyzed using contextual data (e.g., metadata) from the current meeting, such as the identities of participants 108A-N, the topic of the current discussion, etc. Meeting intelligence apparatus 102 may search the meeting repository for information that most closely matches the contextual data from the current meeting. For example, meeting intelligence apparatus 102 may search the meeting repository for any prior meetings that included some or all of the participants 108A-N of the current meeting and rank the results. Meeting intelligence apparatus 102 may then determine that the "last meeting" refers to the top result and may search for the last agenda topic in the prior meeting that corresponds to the top result.

Intervention data 310 that is generated in response to natural language request 406 includes stored information 410 that meeting intelligence apparatus 102 retrieves in response to natural language request 406. Meeting intelligence apparatus 102 includes data retrieval logic 408, which performs a search for stored information 410 that is responsive to natural language request 406. For example, data retrieval logic 408 may search a meeting repository and/or external data sources, such as websites on the Internet. In the example of FIG. 4C, meeting intelligence apparatus 102 generates second meeting content data 312 that includes stored information 410 retrieved from a meeting repository. The stored information 410 includes the answer to the question about a different meeting.

In an embodiment, meeting intelligence apparatus 102 may process natural language request 406 and research a particular topic or otherwise search for information that is unrelated to a particular meeting. For example, natural language request 406 may be the statement "We need to figure out how to get source code from the app." In response, meeting intelligence apparatus 102 may retrieve information from various websites that address natural language request 406. As shall be described in greater detail hereafter, this can be a particularly useful feature for participants 108A-N who wish to collaborate, during electronic meeting 100, to create a presentation, a report, or any other document.

C. Meeting Content Supplementation

Meeting intelligence apparatus 102 can supplement first meeting content data 302 with second meeting content data 312 in any of a number of ways. For example, meeting intelligence apparatus 102 may cause participant identifiers to be presented at one or more nodes 106A-N. Additionally or alternatively, meeting intelligence apparatus 102 may cause a language translation or format conversion of first meeting content data 302 to be presented at one or more nodes 106A-N.

FIG. 4D is a block diagram that depicts an arrangement for supplementing meeting content with participant identification data. Referring to FIG. 4D, meeting intelligence apparatus 102 includes voice or face recognition logic 412, which performs voice or face recognition on first meeting content data 302 to detect a voice or a face. The voice or face is a cue 304 for meeting intelligence apparatus 102 to generate intervention data 310 to be sent to at least node 106A during electronic meeting 100. In response to detecting the cue 304, meeting intelligence apparatus 102 determines one or more participants 108A-N and generates participant identification data 206 that identifies the one or more participants 108A-N. Meeting intelligence apparatus 102 generates and transmits second meeting content data 312 that includes participant identification data 206. When processed at one or more nodes 106A-N, second meeting content data 312 causes participant identification data 206 to be presented at the one or more nodes 106A-N.

In an embodiment, meeting intelligence apparatus 102 can perform speech or text recognition on first meeting content data 302 to detect a particular language, which may be a cue 304 for meeting intelligence apparatus 102 to generate second meeting content data 312 that includes a translation of first meeting content data 302 into a different language. For example, meeting intelligence apparatus 102 may translate English content into Japanese content. Second meeting content data 312 may replace or supplement first meeting content data 302. For example, second meeting content data 312 may cause Japanese dubbing of first meeting content data 302 or may cause Japanese subtitles to be added to first meeting content 302.

In an embodiment, meeting intelligence apparatus 102 can detect input from an input/output mechanism, and the input may be a cue 304 for meeting intelligence apparatus 102 to convert the input into a different format. For example, the input/output mechanism may be an electronic whiteboard that receives as input first meeting content data 302 in the form of handwritten notes or hand-drawn illustrations. Based on optical character recognition (OCR), vector graphics, and/or any other data conversion tool, meeting intelligence apparatus 102 may convert first meeting content data 302 into second meeting content data 312 in the form of machine-lettering or a machine-drawn image. When processed at one or more nodes 106A-N, second meeting content data 312 may cause the machine-lettering or the machine-drawn image to be provided as output on the electronic whiteboard.

D. Meeting Content Metadata Generation

FIGS. 4A-D each depict second meeting content data 312 that includes a variety of meeting content metadata. Meeting intelligence apparatus 102 generates the meeting content metadata based on internal and/or external information. Internal information includes information readily accessible to meeting intelligence apparatus 102 even in the absence of a network connection. For example, if meeting intelligence apparatus 102 is a computer, the system date and time are internal information. In contrast, external information includes information accessible to meeting intelligence apparatus 102 via a network connection. For example, information retrieved from external data sources are external information.

FIGS. 4A-D each depict sending meeting content metadata to one or more nodes 106A-N during electronic meeting 100. However, some meeting content metadata may remain untransmitted throughout the duration of electronic meeting 100. For example, some meeting content metadata may remain stored in meeting intelligence apparatus 102 for an internal use, such as generating a report. As shall be described in greater detail in FIG. 6C, a notable example of such meeting content metadata is a label that identifies a key meeting point, such as an action item, a task, a deadline, etc.

IV. Post-Processing

Meeting intelligence apparatus 102 can provide any of a number of services outside of electronic meeting 100 based on analyzing meeting content. Meeting intelligence apparatus 102 may analyze meeting content at any time relative to electronic meeting 100. For example, after electronic meeting 100 ends, meeting intelligence apparatus 102 may analyze stored meeting content data and generate a report based on analyzed meeting content data. Alternatively, meeting intelligence apparatus 102 may analyze meeting content data during electronic meeting 100 and may generate, after electronic meeting 100 ends, a report based on analyzed meeting content data. The report may be any of a number of documents, such as a meeting agenda, a meeting summary, a meeting transcript, a meeting participant analysis, a slideshow presentation, etc.

Figure 5:
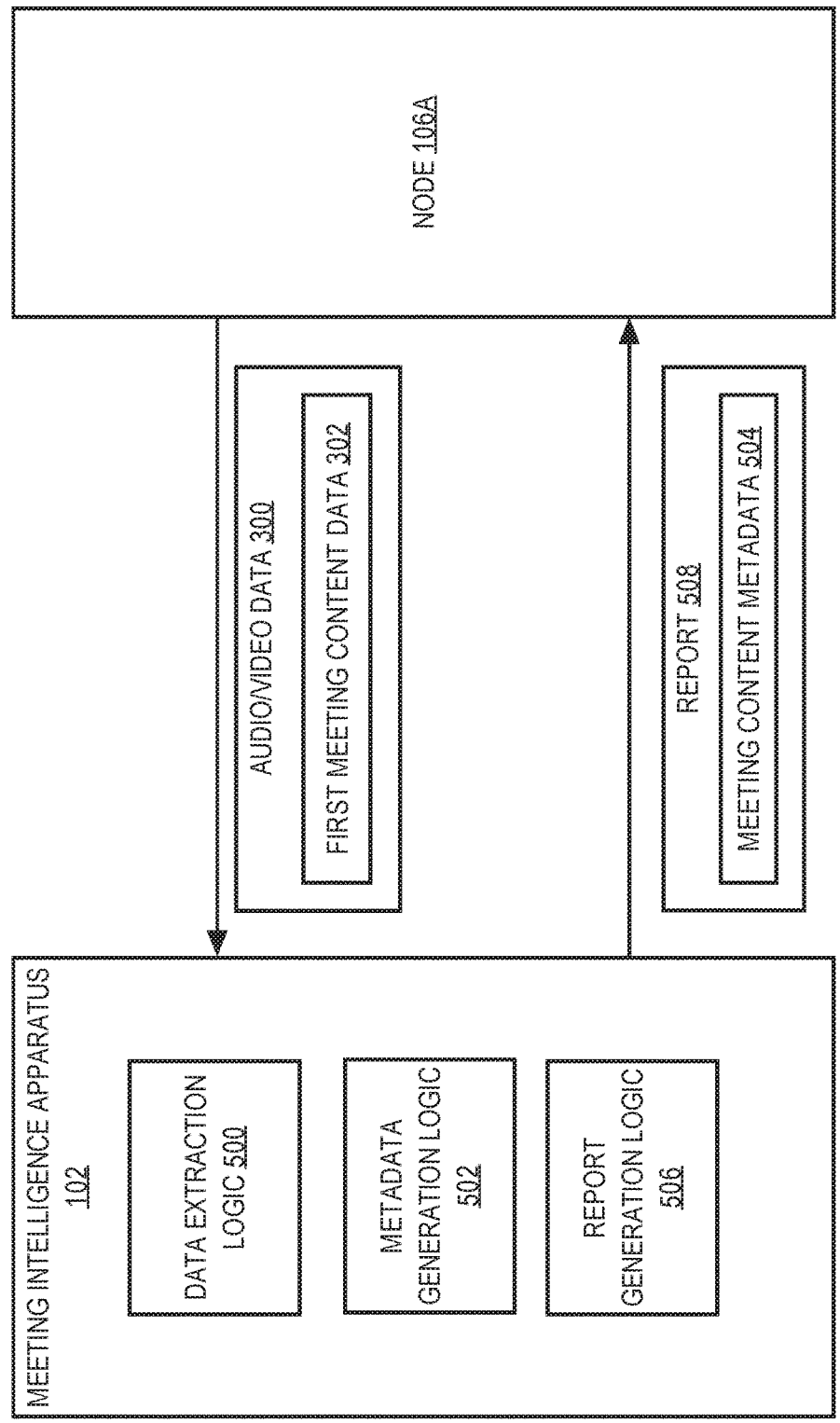
FIG. 5 is a block diagram that depicts an arrangement for generating a report.

FIG. 5 is a block diagram that depicts an arrangement for generating a report. Referring to FIG. 5, meeting intelligence apparatus 102 receives, from node 106A, audio/video data 300 that includes first meeting content data 302. Meeting intelligence apparatus 102 includes data extraction logic 500, metadata generation logic 502, and report generation logic 506. Data extraction logic 500 causes first meeting content data 302 to be extracted from audio/video data 300. Meeting intelligence apparatus 102 analyzes first meeting content data 302 and uses metadata generation logic 502 to generate meeting content metadata 504. Report generation logic 506 causes meeting content metadata 504 to be included in report 508.

Meeting intelligence apparatus 102 may do any of a number of things with report 508. For example, meeting intelligence apparatus 102 may store report 508 in a meeting repository or provide report 508 to one or more nodes 106A-N associated with participants 108A-N of electronic meeting 100. Thus, meeting intelligence apparatus 102 may generate report 508 in an offline mode and/or an online mode.

A. Meeting Content Analysis

Figure 6B:
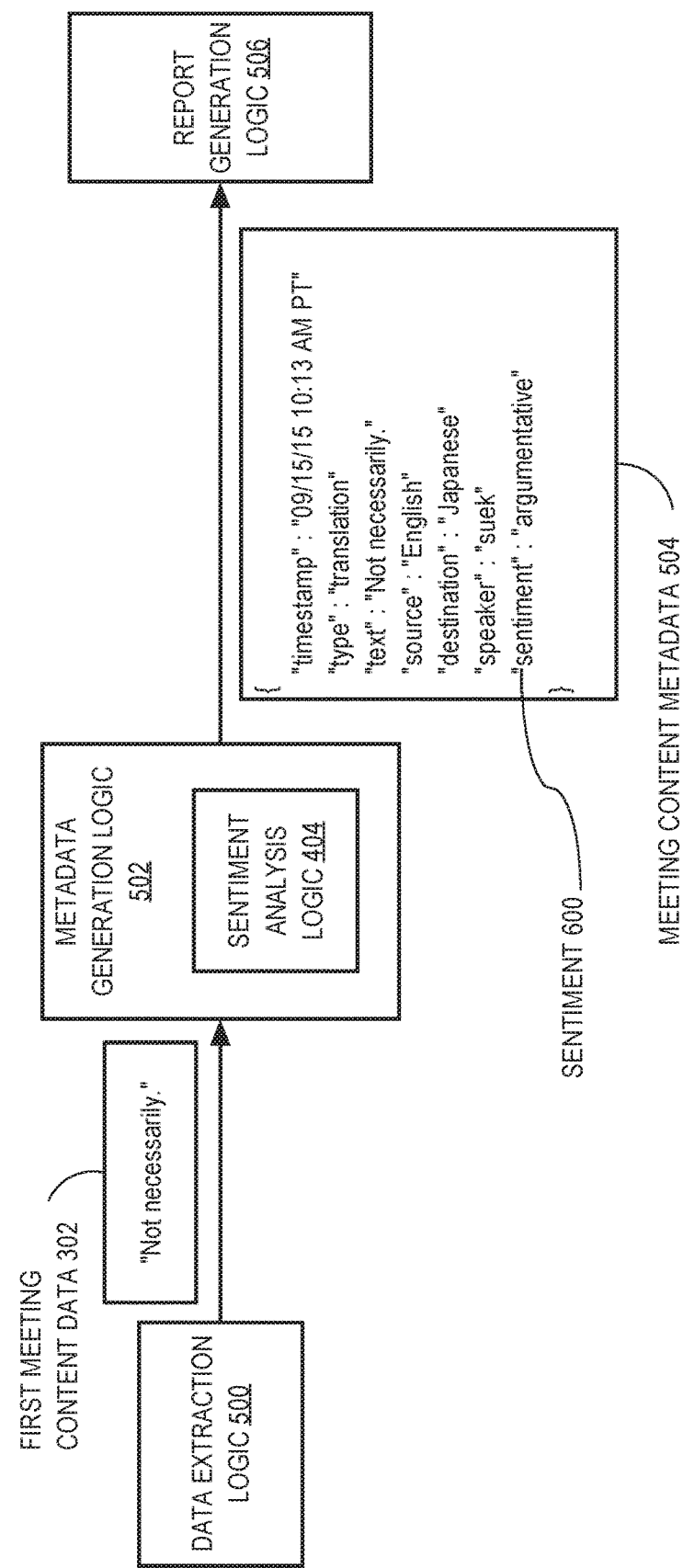
Figure 6C:
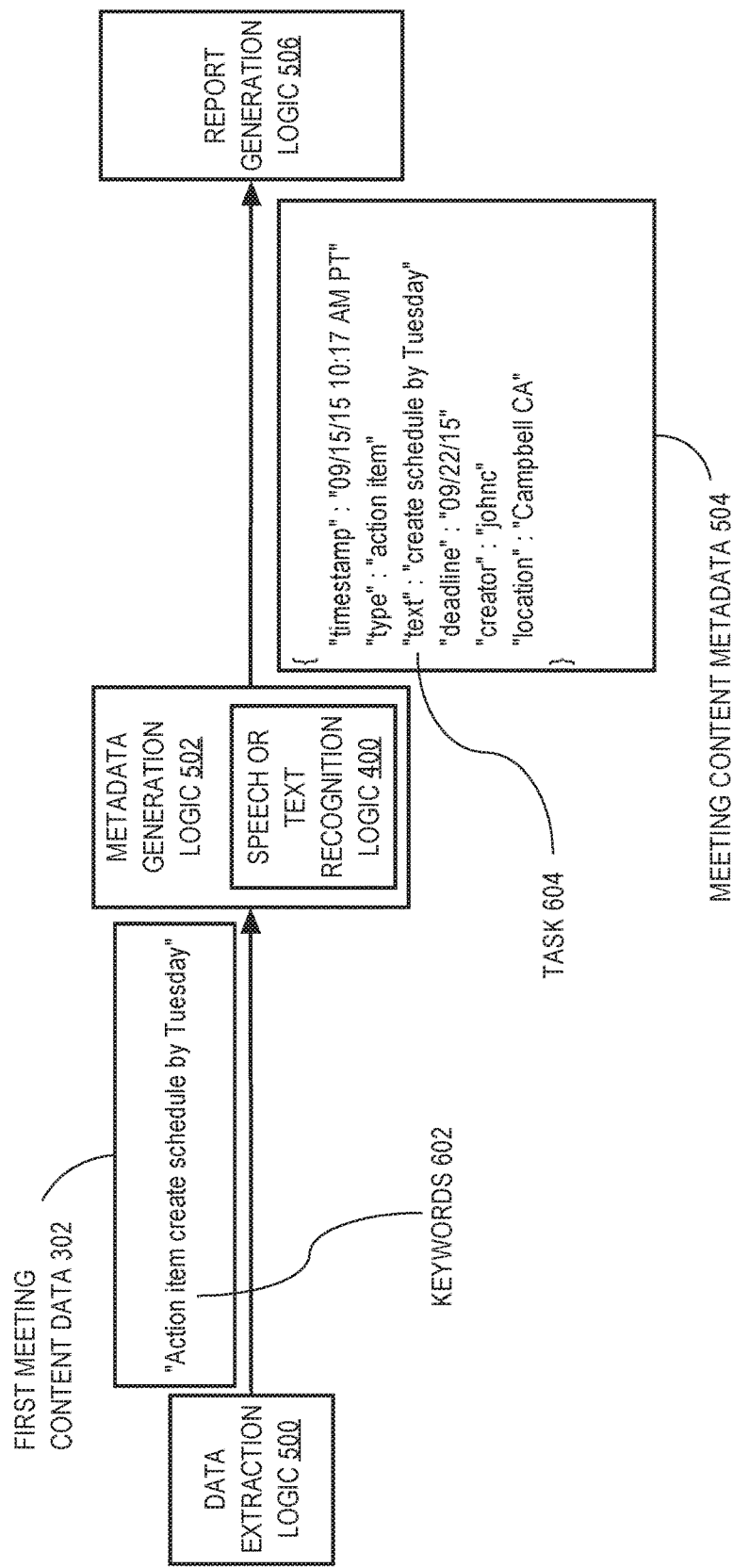

In an embodiment, meeting intelligence apparatus 102 generates meeting content metadata 504 during electronic meeting 100. For example, data generation logic 308 may include metadata generation logic 502, and second meeting content data 312 may include meeting content metadata 504. FIGS. 6A-C depict examples of meeting content metadata 504 that can be generated during electronic meeting 100.

FIG. 6A is a block diagram that depicts an arrangement for generating meeting content metadata 504 that includes participant identification data 206. Referring to FIG. 6A, data extraction logic 500 extracts and provides first meeting content data 302 to metadata generation logic 502. In the example of FIG. 6A, metadata generation logic 502 includes voice or face recognition logic 412, which performs voice or face recognition on first meeting content data 302 to identify one or more participants 108A-N in electronic meeting 100. Metadata generation logic 502 generates meeting content metadata 504 that includes participant identification data 206 for the one or more participants 108A-N. Metadata generation logic 502 provides meeting content metadata 504 to report generation logic 506.

FIG. 6B is a block diagram that depicts an arrangement for generating meeting content metadata 504 that includes a sentiment detected in first meeting content data 302. Referring to FIG. 6B, data extraction logic 500 extracts first meeting content data 302 that includes the statement "Not necessarily." Metadata generation logic 502 includes sentiment analysis logic 404, which performs sentiment analysis on first meeting content data 302 to determine sentiment 600 of a participant in electronic meeting 100. Meeting generation logic 502 generates meeting content metadata 504 that includes sentiment 600. In the example of FIG. 6B, meeting content metadata 504 also includes participant identification data 206 and information related to providing a translation of first meeting content data 302. Thus, metadata generation logic 502 can include a combination of sentiment analysis logic 404, voice or face recognition logic 412, and speech or text recognition logic 400.

FIG. 6C is a block diagram that depicts an arrangement for generating meeting content metadata 504 that includes a label to identify a key meeting point. Referring to FIG. 6C, first meeting content data 302 includes the statement "Action item create schedule by Tuesday". Metadata generation logic 502 includes speech or text recognition logic 400, which performs speech or text recognition on first meeting content data 302 to recognize one or more keywords 602 in first meeting content data 302. The one or more keywords 602 may indicate a task 604 to be completed after electronic meeting 100. For example, the one or more keywords 602 may include a voice or text command to perform a particular task. In the example of FIG. 6C, the one or more keywords 602 are the label "Action item" followed by the command "create schedule by Tuesday". Metadata generation logic 502 generates meeting content metadata 504 that includes the one or more keywords 602 and/or the task 604.

Figure 7A:
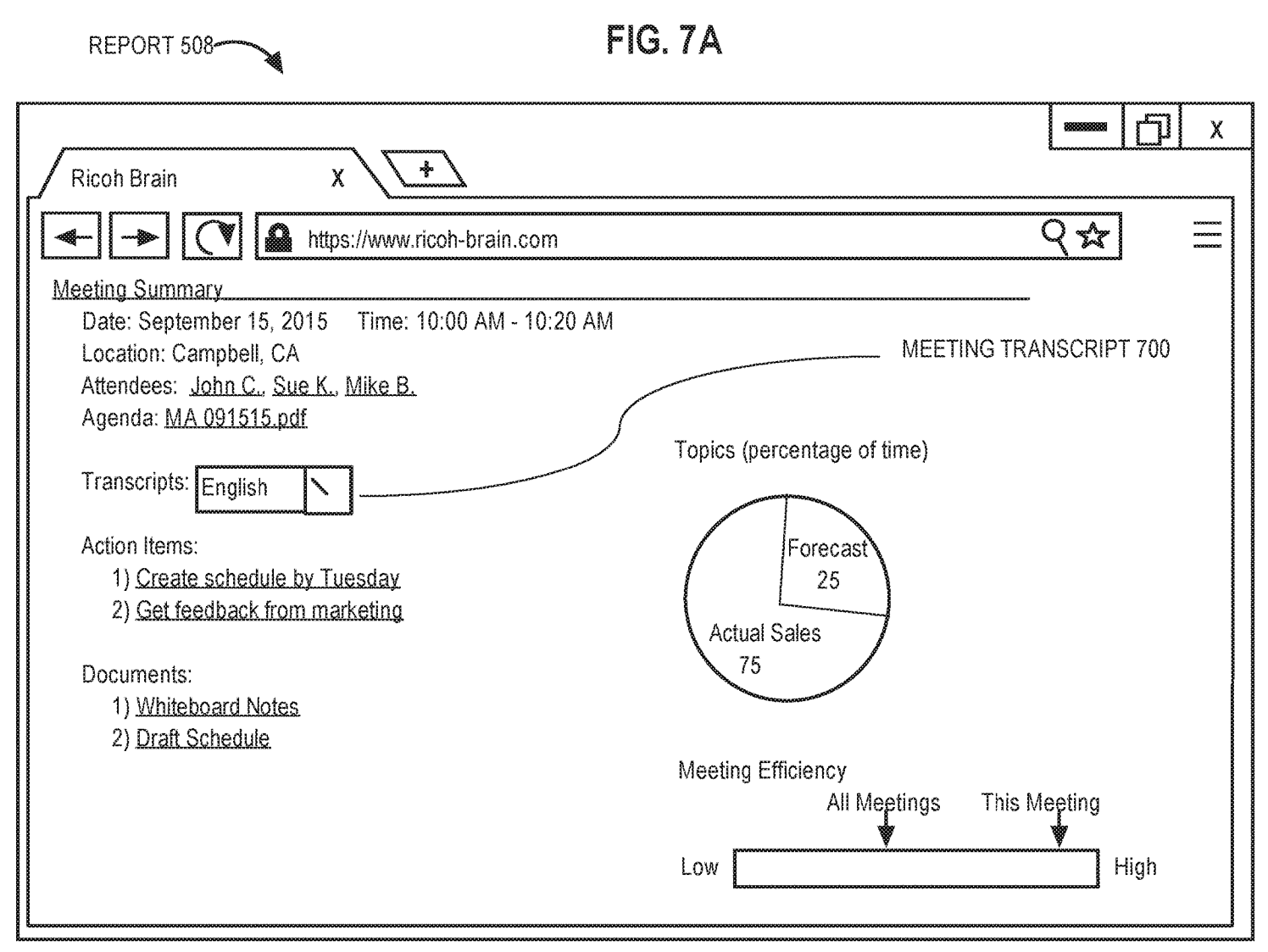

Meeting intelligence apparatus 102 may generate meeting content metadata 504 based on internal and/or external information, such as geolocation information or a meeting room availability schedule. In each of FIGS. 6A-C, report generation logic 506 includes meeting content metadata 504 in report 508. FIGS. 7A-B depict examples of report 508. Referring to FIGS. 7A-B, meeting intelligence apparatus 102 provides report 508 via a web-based participant interface. Meeting intelligence apparatus 102 may send report 508 to one or more nodes 106A-N at any of a number of times, such as upon demand, upon detecting a network connection, automatically after each electronic meeting 100, etc.

B. Meeting Summary

FIG. 7A depicts an example meeting summary. In the example of FIG. 7A, report 508 is a meeting summary that includes many of the meeting content metadata 504 depicted in FIGS. 6A-C. A meeting summary may include explicit data and/or implicit data. Explicit data includes meeting content data, such as documents, images, and/or any other data originating from the one or more nodes 106A-N. In the example of FIG. 7A, explicit data may include the meeting agenda, the list of "Action Items", and/or the list of "Documents". Implicit data includes meeting content metadata 504, such as identifiers, translations, and/or any other data generated by meeting intelligence apparatus 102. For example, the meeting summary may include a drop-down list providing links to a meeting transcript 700 in the multiple languages depicted in FIG. 6B. As another example, the participant identification data 206 depicted in FIG. 6A are provided in the meeting summary as links to individual reports related to each participant. As shall be described in greater detail in FIG. 7B, the individual reports may include participant metrics.

In the example of FIG. 7A, the meeting summary also includes underlined links to other reports, such as the meeting agenda depicted in FIG. 2, task 604 depicted in FIG. 6C, and various documents generated based on one or more input/output mechanisms. For example, the one or more input/output mechanisms may include an electronic whiteboard. Meeting intelligence apparatus 102 may convert any handwritten notes or hand-drawn illustrations received as input on the electronic whiteboard into a machine-lettered or a machine-drawn image based on optical character recognition (OCR), vector graphics, and/or any other data conversion tool. For example, meeting intelligence apparatus 102 may perform OCR on handwritten notes to generate metadata that indicates which letters were detected. The metadata may then be used to generate the detected letters in a particular font or any other machine-lettering format.

In an embodiment, the meeting summary may include graphical depictions of meeting efficiency. In the example of FIG. 7A, the meeting summary includes a pie chart that details the amount of time spent during electronic meeting 100 on each agenda topic 202. FIG. 7A also includes a bar representing an efficiency spectrum. An arrow and/or a colored portion of the bar may indicate the relative position on the bar for a particular meeting.

C. Participant Analysis

FIG. 7B depicts an example participant analysis. As described above, selecting a particular participant in the meeting summary may cause an individual report for the selected participant to be presented. The individual report may include participation metrics 702 for the selected participant. In the example of FIG. 7B, report 508 is the individual report "Meeting Participant Profile." Among the participation metrics 702 depicted in FIG. 7B are the amount of participation time for the selected participant, a participation index for the selected participant, a role associated with the selected participant, and a list of timestamped sentiments detected for the selected participant. The participation index may be any measure, weighted or otherwise, of any aspect of the selected participant's contribution to the meeting. For example, "63/100" may indicate a proportion of the total meeting time during which the selected participant spoke. The role associated with the selected participant may indicate any of a number of categories that describe the selected participant relative to the current meeting and/or within a particular entity (e.g., a vice-president of a corporation). For example, "Active Presenter" may indicate that the selected participant did not merely respond to other participants, but also provided many of the topics for discussion.

V. Process Overview

Figure 9:
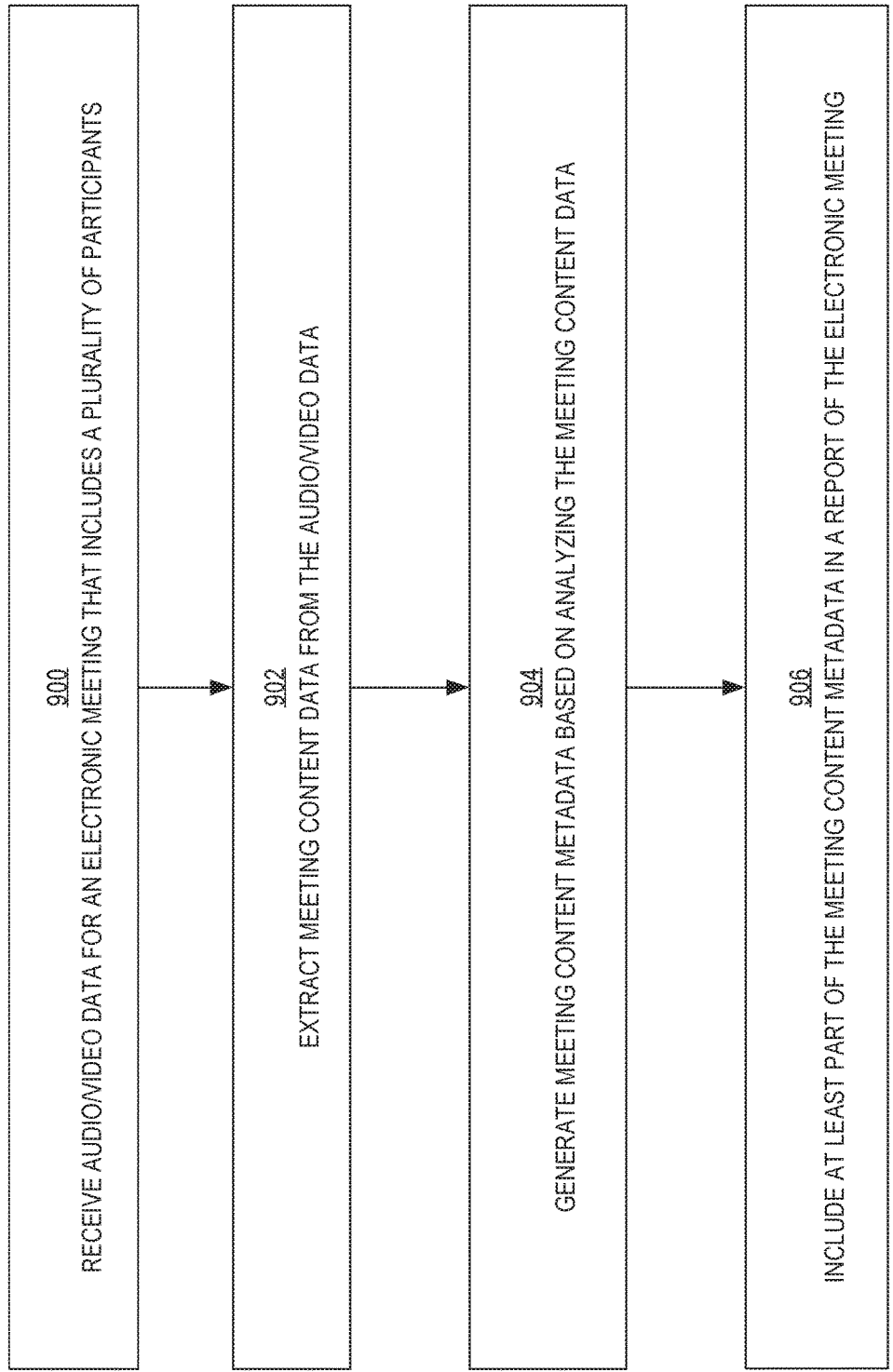
FIG. 9 is a flow diagram that depicts an approach for generating a report.

FIGS. 8 and 9 are flow diagrams that depict various processes that can be performed by meeting intelligence apparatus 102. In an embodiment, FIG. 8 depicts a process that is performed with a network connection during electronic meeting 100. In an embodiment, FIG. 9 depicts a process that can be performed, at least partially, with or without a network connection.

A. Generating Intervention Data

FIG. 8 is a flow diagram that depicts an approach for generating intervention data 310. At block 800, a meeting intelligence apparatus 102 receives audio/video data 300 for an electronic meeting 100 that includes a plurality of participants 108A-N. The audio/video data 300 includes first meeting content data 302 for the electronic meeting 100. For example, Ricoh Brain may receive a videoconference stream from a Ricoh UCS P3500 associated with Alice, who is making an offer to Bob during the electronic meeting 100.

At block 802, the meeting intelligence apparatus 102 determines that the audio/video data 300 includes a cue 304 for the meeting intelligence apparatus 102 to intervene in the electronic meeting 100. The meeting intelligence apparatus 102 may make this determination based on performing any of a number of analyses on the audio/video data 300, such as speech or text recognition, voice or face recognition, sentiment analysis, etc. For example, Ricoh Brain may extract and analyze first meeting content data 302 to detect poor eye contact by Alice. The poor eye contact may be a cue 304 for Ricoh Brain to respond by sending a recommendation to Bob.

At block 804, the meeting intelligence apparatus 102 generates intervention data 310 in response to detecting the cue 304. The intervention data 310 includes second meeting content data 312 that is different from the first meeting content data 302. For example, Ricoh Brain may generate a recommendation that advises Bob to make a counteroffer.

At block 806, the meeting intelligence apparatus 102 sends the intervention data 310 to one or more nodes 106A-N during the electronic meeting 100. The one or more nodes 106A-N are associated with at least one participant of the plurality of participants 108A-N. For example, Ricoh Brain may send the recommendation to Bob and withhold the recommendation from Alice.

B. Generating Reports

FIG. 9 is a flow diagram that depicts an approach for generating a report 508. At block 900, a meeting intelligence apparatus 102 receives audio/video data 300 for an electronic meeting 100 that includes a plurality of participants 108A-N. For example, Ricoh Brain may receive an audioconference data packet from Charlie's smartphone, which is executing the Ricoh UCS app.

At block 902, the meeting intelligence apparatus 102 extracts meeting content data from the audio/video data 300. For example, Ricoh Brain may strip out header data and analyze the payload of the audioconference data packet. Analyzing the payload may involve performing speech or text recognition, sentiment analysis, voice or face recognition, etc.

At block 904, the meeting intelligence apparatus 102 generates meeting content metadata 504 based on analyzing the meeting content data. For example, Ricoh Brain may perform voice recognition on the meeting content data to identify Charlie as the person presenting at the electronic meeting 100. Ricoh Brain may generate JSON that includes "speaker: Charlie" among the name-value pairs.

At block 906, the meeting intelligence apparatus 102 includes at least part of the meeting content metadata 504 in a report 508 of the electronic meeting 100. For example, Ricoh Brain may generate a "Meeting Summary" report that includes "Charlie" among the participants 108A-N of the electronic meeting 100.

VI. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
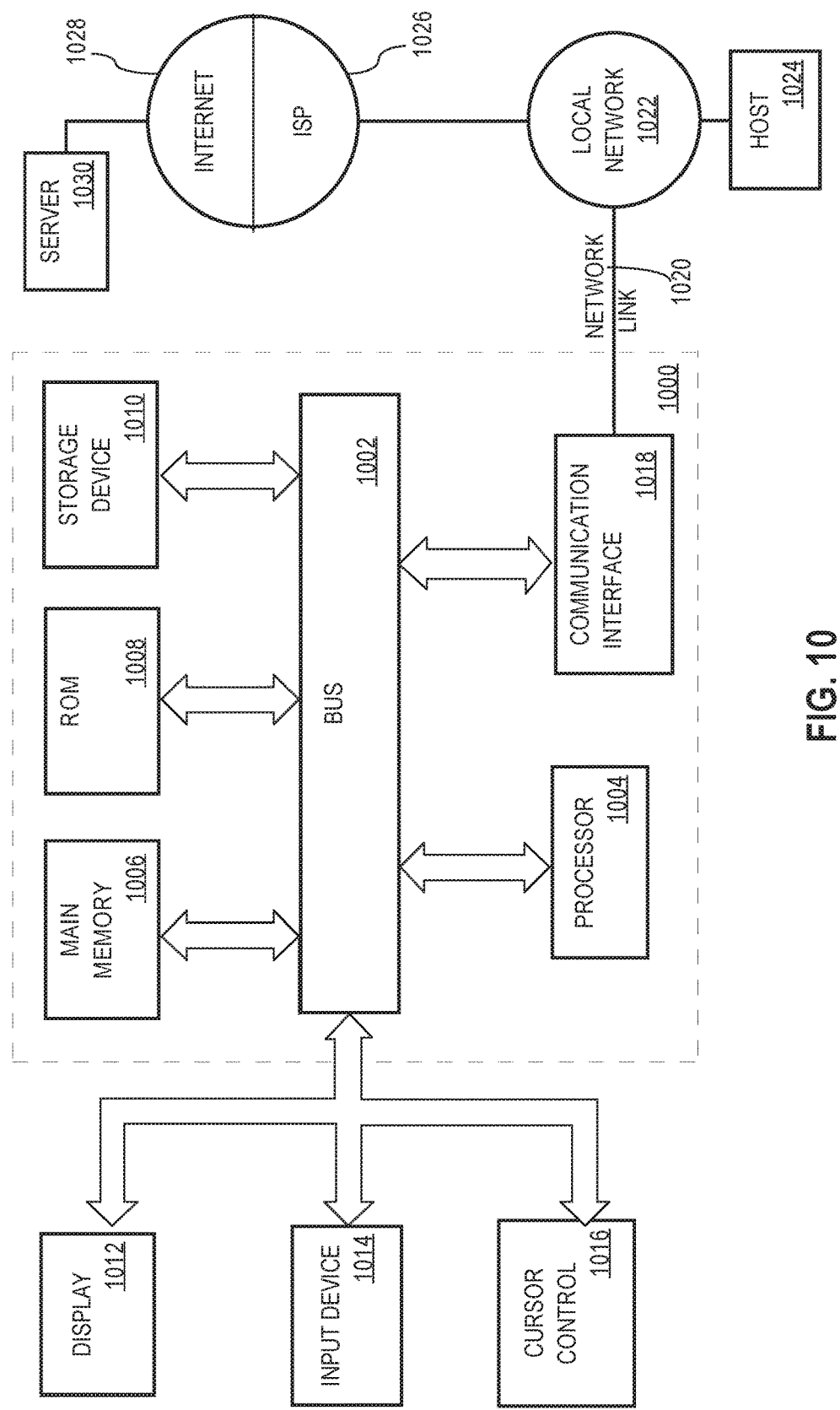
FIG. 10 depicts an example computer system upon which embodiments may be implemented.

For example, FIG. 10 is a block diagram that depicts a computer system 1000 upon which an embodiment may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. An apparatus comprising:
   one or more processors; and
   one or more non-transitory computer-readable media storing instructions which, when processed by the one or more processors, cause:
   receiving, at the apparatus, first meeting content data for an electronic meeting that includes one or more participants;
   determining, by the apparatus analyzing the first meeting content data for the electronic meeting that includes one or more participants, whether there are one or more action items for the electronic meeting that includes one or more participants;
   in response to the determining, by the apparatus analyzing the first meeting content data for the electronic meeting that includes one or more participants, that there are one or more actions items for the electronic meeting that includes one or more participants, generating meeting content metadata that specifies the one or more action items.

2. The apparatus of claim 1, wherein the one or more non-transitory computer-readable media store additional instructions which, when processed by the one or more processors, cause one or more of: transmitting the meeting content metadata to a node associated with a participant of electronic meeting, including the meeting content metadata in a meeting summary or meeting report for the electronic meeting, or providing the meeting content metadata to an external data source.

3. The apparatus of claim 1, wherein the one or more non-transitory computer-readable media store additional instructions which, when processed by the one or more processors, cause:
   generating second meeting content data and including, in the second meeting content data, the meeting content metadata that specifies the one or more action items; and
   transmitting the second meeting content metadata to a node associated with a participant of electronic meeting.

4. The apparatus of claim 1, wherein:
   the first meeting content data includes audio/video data, and
   determining, by the apparatus, that the first meeting content data for the electronic meeting that includes one or more participants includes one or more actions items includes identifying, by the apparatus, text contained in the audio/video data.

5. The apparatus of claim 4, wherein the text is identified by one or more of speech or text recognition, or text formatting.

6. The apparatus of claim 4, wherein the text includes a label and a command.

7. The apparatus of claim 6, wherein the command is a task to be completed.

8. The apparatus of claim 7, wherein the task to be completed is included in a meeting summary or meeting report for the electronic meeting.

9. The apparatus of claim 8, wherein the one or more non-transitory computer-readable media store additional instructions which, when processed by the one or more processors, cause transmitting the meeting summary or meeting report for the electronic meeting to a node associated with a participant of electronic meeting.

10. The apparatus of claim 1, wherein:
    the first meeting content data includes one or more of hand-written notes or hand-drawn illustrations, and
    determining, by the apparatus, that the first meeting content data for the electronic meeting that includes one or more participants includes one or more actions items includes identifying, by the apparatus, the one or more action items from one or more of the hand-written notes or the hand-drawn illustrations.

11. One or more non-transitory computer-readable media storing instructions which, when processed by one or more processors, cause:
    receiving, at an apparatus, first meeting content data for an electronic meeting that includes one or more participants;
    determining, by the apparatus analyzing the first meeting content data for the electronic meeting that includes one or more participants, whether there are one or more action items for the electronic meeting that includes one or more participants;
    in response to the determining, by the apparatus analyzing the first meeting content data for the electronic meeting that includes one or more participants, that there are one or more actions items for the electronic meeting that includes one or more participants, generating meeting content metadata that specifies the one or more action items.

12. The one or more non-transitory computer-readable media of claim 11, further comprising additional instructions which, when processed by the one or more processors, cause one or more of: transmitting the meeting content metadata to a node associated with a participant of electronic meeting, including the meeting content metadata in a meeting summary or meeting report for the electronic meeting, or providing the meeting content metadata to an external data source.

13. The one or more non-transitory computer-readable media of claim 11, further comprising additional instructions which, when processed by the one or more processors, cause:

generating second meeting content data and including, in the second meeting content data, the meeting content metadata that specifies the one or more action items; and transmitting the second meeting content metadata to a node associated with a participant of electronic meeting.

14. The one or more non-transitory computer-readable media of claim 11, wherein:

the first meeting content data includes audio/video data, and determining, by the apparatus, that the first meeting content data for the electronic meeting that includes one or more participants includes one or more actions items includes identifying, by the apparatus, one or more recognized keywords contained in the audio/video data.

15. The one or more non-transitory computer-readable media of claim 14, wherein the recognized keywords are identified by speech or text recognition.

16. The one or more non-transitory computer-readable media of claim 14, wherein the recognized keywords include a label and a command.

17. The one or more non-transitory computer-readable media of claim 16, wherein the command is a task to be completed.

18. The one or more non-transitory computer-readable media of claim 17, wherein the task to be completed is included in a meeting summary or meeting report for the electronic meeting.

19. The one or more non-transitory computer-readable media of claim 18, further comprising additional instructions which, when processed by the one or more processors, cause transmitting the meeting summary or meeting report for the electronic meeting to a node associated with a participant of electronic meeting.

20. A computer-implemented method comprising:

receiving, at an apparatus, first meeting content data for an electronic meeting that includes one or more participants;

determining, by the apparatus analyzing the first meeting content data for the electronic meeting that includes one or more participants, whether there are one or more action items for the electronic meeting that includes one or more participants;

in response to the determining, by the apparatus analyzing the first meeting content data for the electronic meeting that includes one or more participants, that there are one or more actions items for the electronic meeting that includes one or more participants, generating meeting content metadata that specifies the one or more action items.

\* \* \* \* \*